(12) United States Patent
Xing et al.

(10) Patent No.: US 12,369,199 B2
(45) Date of Patent: Jul. 22, 2025

(54) INFORMATION TRANSMISSION METHOD, COMMUNICATION APPARATUS, AND COMPUTER-READABLE STORAGE MEDIUM

(71) Applicant: HUAWEI TECHNOLOGIES CO., LTD., Shenzhen (CN)

(72) Inventors: Shuangshuang Xing, Shenzhen (CN); Xiuqiang Xu, Shanghai (CN); Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 397 days.

(21) Appl. No.: 18/145,943

(22) Filed: Dec. 23, 2022

(65) Prior Publication Data

US 2023/0156821 A1    May 18, 2023

Related U.S. Application Data

(63) Continuation of application No. PCT/CN2021/101331, filed on Jun. 21, 2021.

(30) Foreign Application Priority Data

Jun. 29, 2020   (CN) .................... 202010605307.X

(51) Int. Cl.
*H04W 74/0833*   (2024.01)
*H04W 74/04*   (2009.01)

(52) U.S. Cl.
CPC ....... *H04W 74/0841* (2013.01); *H04W 74/04* (2013.01)

(58) Field of Classification Search
CPC .................... H04W 74/04; H04W 74/0841
See application file for complete search history.

(56) References Cited

U.S. PATENT DOCUMENTS

| | | | |
|---|---|---|---|
| 11,917,596 B2* | 2/2024 | Jung | H04W 24/10 |
| 2011/0029677 A1 | 2/2011 | Altmann | |
| 2017/0359840 A1 | 12/2017 | Ly et al. | |
| 2021/0378027 A1* | 12/2021 | Wang | H04W 74/0836 |
| 2022/0070938 A1* | 3/2022 | Wu | H04L 5/0094 |

FOREIGN PATENT DOCUMENTS

| | | |
|---|---|---|
| CN | 1561119 A | 1/2005 |
| CN | 107690200 A | 2/2018 |
| WO | 2015051486 A1 | 4/2015 |

(Continued)

OTHER PUBLICATIONS

Huawei, "UE based measurements for RACH Optimisation (Rel-9)", 3GPP R3-091109, Apr. 28, 2009, total 3 pages.

(Continued)

*Primary Examiner* — James P Duffy
(74) *Attorney, Agent, or Firm* — HAUPTMAN HAM, LLP

(57) ABSTRACT

An information transmission method includes sending, by a terminal, second information and uplink data. The uplink data is sent in a second access mode. The second information indicates a first access mode. The first access mode is useable by the terminal to send the uplink data before the terminal sends the uplink data in the second access mode.

18 Claims, 10 Drawing Sheets

(56) References Cited

FOREIGN PATENT DOCUMENTS

WO      2018028675 A1      2/2018

OTHER PUBLICATIONS

International Search Report issued in corresponding International Application No. PCT/CN2021/101331, dated Sep. 24, 2021, pp. 1-10.
M. Condolucia et al: "Virtual Code Resource Allocation Approach for Energy-Aware access of Machine-Type Communications over 5G Smart City", Computer Science, Engineering, Environmental Science, Sep. 18, 2015, total 14 pages.
Hearing Notice issued in corresponding India Application No. 202317003640, dated Jan. 27, 2025, pp. 1-4.
Yu-Ngok Ruyue L et al,"Power Saving Techniques for 5G and Beyond", IEEE Access, Jun. 22, 2020, total 16 pages, doi:10.1109/ACCESS.2020.3001180.
India Hearing Notice in corresponding India Application No. 202317003640, dated Dec. 31, 2024, pp. 1-3.
India Office Action issued in corresponding India Application No. 202317003640, dated Nov. 15, 2023, pp. 1-6.

* cited by examiner

INFORMATION TRANSMISSION METHOD, COMMUNICATION APPARATUS, AND COMPUTER-READABLE STORAGE MEDIUM

CROSS-REFERENCE TO RELATED APPLICATIONS

This application is a continuation of International Application No. PCT/CN2021/101331, filed on Jun. 21, 2021, which claims priority to Chinese Patent Application No. 202010605307.X, filed on Jun. 29, 2020. The disclosures of the aforementioned applications are hereby incorporated by reference in their entireties.

TECHNICAL FIELD

This application relates to the field of communication technologies, and in particular, to an information transmission method, a communication apparatus, and a computer-readable storage medium.

BACKGROUND

With rapid development of ultra-reliable low-latency communication (ultra reliable low latency, URLLC), machine type communication (machine type communication, MTC), and the internet of things (internet of things, IoT), data transmission with small packets and requirements for a low latency are applied to more application scenarios. To meet transmission efficiency of this type of data, the terminal may support a plurality of access modes, for example, early data transmission (early data transmission, EDT), two-step random access (2-step physical random access channel, 2-step RACH), and contention-free configured grant transmission (contention-free configured grant transmission, contention-free CG). In this way, if an access process or a data transmission process of an access mode fails, another access mode may be used for an access attempt or a data transmission attempt, to increase a probability of successful access or successful data transmission.

For example, a terminal selects the 2-step RACH to perform an access operation. If a quantity of times that the terminal sends a MsgA of the 2-step RACH reaches a maximum quantity of access times configured for the 2-step RACH, and a network device still cannot correctly decode uplink data carried in the MsgA, in other words, the access still fails, the terminal may use four-step random access (4-step physical random access channel, 4-step RACH), and send a Msg1 in a 4-step RACH process. To be specific, the terminal sends a preamble to the network device, and after receiving a random access response that corresponds to the Msg1 and that is sent by the network device, the terminal sends the uplink data based on an uplink grant (UL grant) in the random access response.

However, for the foregoing scenario in which network access or data transmission may be performed in a plurality of access modes, how to improve access efficiency or data transmission efficiency of the terminal becomes an urgent problem to be resolved.

SUMMARY

This application provides an information transmission method, a communication apparatus, and a computer-readable storage medium, to help improve access efficiency or data transmission efficiency of a terminal.

According to a first aspect, this application provides an information transmission method. In this method, a terminal sends second information and uplink data, where the uplink data is sent in a second access mode. The second information indicates a first access mode, and the first access mode is an access mode that is used by the terminal to send the uplink data before the terminal sends the uplink data in the second access mode.

It can be learned that when sending the uplink data in the second access mode, the terminal further sends the second information, to notify the network device of the first access mode that is used by the terminal to send the uplink data before the terminal sends the uplink data in the second access mode. This helps the network device learn that the second access mode is an access mode used by the terminal when the terminal fails to send the uplink data by using the first access mode, and helps the network device optimize resource configuration information of the first access mode, to improve access efficiency or data transmission efficiency of the terminal.

In an implementation, the second access mode is four-step random access 4-step RACH. The first access mode is one of the following plurality of access modes: contention-free configured grant transmission contention-free CG, contention-based configured grant transmission contention-based CG, and two-step random access 2-step RACH.

In another optional implementation, the second access mode is early data transmission EDT. The first access mode is one of the following plurality of access modes: contention-free configured grant transmission contention-free CG, contention-based configured grant transmission contention-based CG, and two-step random access with user plane data 2-step RACH with UP data.

In still another optional implementation, the second access mode is two-step random access 2-step RACH. The first access mode is one of the following plurality of access modes: contention-free configured grant transmission contention-free CG and contention-based configured grant transmission contention-based CG.

It can be learned that when the first access mode used by the terminal is the contention-free CG, and the terminal fails to send the uplink data by using the contention-free CG, the terminal may attempt to send the uplink data in one of the following access modes: the 4-step RACH, the EDT, or the 2-step RACH. When the first access mode used by the terminal is the contention-based CG, and the terminal fails to send the uplink data by using the contention-based CG, the terminal may attempt to send the uplink data in one of the following access modes: the 4-step RACH, the EDT, or the 2-step RACH. When the first access mode used by the terminal is the 2-step RACH, and the terminal fails to send the uplink data by using the 2-step RACH, the terminal may attempt to send the uplink data in one of the following access modes: the 4-step RACH or the EDT. Therefore, in the foregoing implementations, the second access mode may be flexibly selected based on the first access mode, so that flexibility of selecting the second access mode is improved when access in the first access mode fails. In this way, a probability of success access or success data transmission of the terminal is further improved.

In an optional implementation, the terminal further sends third information, where the third information indicates quantities of times of sending the uplink data in the first access mode and in the second access mode by the terminal. That is, the terminal further sends the third information when sending the second information and the uplink data, to indicate quantities of attempts of sending the uplink data in the first access mode and in the second access mode. In this way, the network device can obtain, based on the quantities, a quantity of attempts of sending the uplink data in the second access mode by the terminal. This helps optimize resource configuration information of the second access mode and improve access efficiency or data transmission efficiency of the terminal.

In an optional implementation, when sending the uplink data in an initial access mode, the terminal may not send first information, where the first information indicates that a current access mode is the initial access mode, to help reduce signaling overheads.

In another optional implementation, when sending the uplink data in the first access mode, the terminal may further send first information, where the first information indicates that a current access mode is the initial access mode. To be specific, in this embodiment, when the terminal sends the uplink data in the first access mode, the first information is also carried. The first information indicates that the current access mode is the initial access mode. When receiving information sent by the terminal, the network device obtains both the uplink data and the first information. In other words, in the information transmission method, before the terminal sends the second information and the uplink data, the terminal may further send the uplink data and the first information in the first access mode, where the first information indicates that the current access mode is the initial access mode. In this manner, formats of uplink information received by the network device are the same, where the uplink information includes the uplink data and the first information, or the uplink information includes the uplink data and the second information. This helps improve compatibility of the network device with the two access modes, and reduce complexity of interpreting the uplink information by the network device.

According to a second aspect, this application further provides an information transmission method. The information transmission method in this aspect corresponds to the information transmission method in the first aspect, and the information transmission method in this aspect is described from a network device side. In the method, when receiving uplink data in a second access mode, a network device further receives second information and determines a first access mode based on the second information. The first access mode is an access mode used by the terminal to send the uplink data before the terminal sends the uplink data in the second access mode. In this way, the network device learns that the second access mode currently used by the terminal is an access mode used by the terminal when the terminal fails to send the uplink data in the first access mode. This helps the network device optimize resource configuration information of the first access mode, to improve access efficiency or data transmission efficiency of the terminal.

In an optional implementation, the second access mode is four-step random access 4-step RACH. The first access mode is one of the following plurality of access modes: contention-free configured grant transmission contention-free CG, contention-based configured grant transmission contention-based CG, and two-step random access 2-step RACH.

In another optional implementation, the second access mode is early data transmission EDT. The first access mode is one of the following plurality of access modes: contention-free configured grant transmission contention-free CG, contention-based configured grant transmission contention-based CG, and two-step random access with user plane data 2-step RACH with UP data.

In still another implementation, the second access mode is two-step random access 2-step RACH. The first access mode is one of the following plurality of access modes: contention-free configured grant transmission contention-free CG and contention-based configured grant transmission contention-based CG.

It can be learned that the first access mode used by the terminal may be a plurality of access modes. When the terminal fails to send the uplink data in the first access mode, there are also a plurality of optional second access modes. Therefore, in the foregoing implementations, the second access mode may be flexibly selected based on the first access mode, so that flexibility of selecting the second access mode is improved when the uplink data fails to be sent in the first access mode, and this helps improve a probability of success access or success data transmission of the terminal is further improved.

In an implementation, the network device further receives third information when receiving the uplink data in the second access mode, where the third information indicates quantities of times of sending the uplink data in the first access mode and in the second access mode by the terminal. In this embodiment of this application, the network device can further obtain, based on the quantities, a quantity of attempts of sending the uplink data in the second access mode by the terminal. This helps optimize resource configuration information of the second access mode and improve access efficiency or data transmission efficiency of the terminal.

In an optional implementation, the terminal does not send first information indicating that a current access mode is an initial access mode. Therefore, when receiving the uplink data in the first access mode, the network device does not receive the first information indicating that the current access mode is the initial access mode, to help reduce signaling overheads.

In another optional implementation, when receiving the uplink data, the network device further receives first information, where the first information indicates that a current access mode of the terminal is an initial access mode. In this embodiment, the network device receives the uplink data and the first information. In other words, in the information transmission method, before the terminal sends the second information and the uplink data, the terminal may further send the uplink data and the first information in the first access mode, where the first information indicates that the current access mode is the initial access mode. In this embodiment of this application, formats of uplink information received by the network device are the same. This helps improve compatibility of the network device with the two access modes, and reduce complexity of interpreting the information by the network device.

According to a third aspect, this application further provides a communication apparatus. The communication apparatus has some or all of functions of implementing the terminal in the first aspect. For example, functions of the communication apparatus may include functions of the terminal in some or all embodiments of this application, or may include functions of separately implementing any embodiment of this application. The function may be implemented by hardware, or may be implemented by hardware executing corresponding software. The hardware or the software includes one or more units or modules corresponding to the functions.

In a possible design, a structure of the communication apparatus may include a processing unit and a communication unit. The processing unit is configured to support the communication apparatus in performing a corresponding function in the foregoing method. The communication unit is configured to support communication between the communication apparatus and another communication apparatus. The communication apparatus may further include a storage unit. The storage unit is configured to be coupled to the processing unit and the communication unit, and the storage unit stores program instructions and data that are necessary for the communication apparatus.

In an implementation, the communication apparatus includes:
  a communication unit, configured to send second information and uplink data. The uplink data is sent in a second access mode.

The second information indicates a first access mode, and the first access mode is an access mode that is used by the terminal to send the uplink data before the terminal sends the uplink data in the second access mode.

In addition, for another optional implementation of the communication apparatus in this aspect, refer to related content of the first aspect. Details are not described herein again.

In an example, the communication unit may be a transceiver or a communication interface, the storage unit may be a memory, and the processing unit may be a processor.

In an implementation, the communication apparatus includes:
  a transceiver, configured to send second information and uplink data. The uplink data is sent in a second access mode.

The second information indicates a first access mode, and the first access mode is an access mode that is used by the terminal to send the uplink data before the terminal sends the uplink data in the second access mode.

In addition, for another optional implementation of the communication apparatus in this aspect, refer to related content of the first aspect. Details are not described herein again.

In an implementation process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may further be divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components may be integrated onto a same chip. For example, a digital baseband processor and a plurality of application processors (including but not limited to a graphics processing unit, a multimedia processor, and the like) may be integrated onto a same chip. Such a chip may be referred to as a system on chip (System on Chip). Whether the components are separately disposed on different chips or integrated and disposed on one or more chips usually depends on a requirement of a product design. Implementation forms of the foregoing components are not limited in this embodiment of this application.

According to a fourth aspect, this application further provides a communication apparatus. The communication apparatus has some or all of functions of implementing the network device in the method example in the second aspect. For example, functions of the communication apparatus may include functions of the network device in some or all embodiments of this application, or may include functions of separately implementing any embodiment of this application. The function may be implemented by hardware, or may be implemented by hardware executing corresponding software. The hardware or the software includes one or more units or modules corresponding to the functions.

In a possible design, a structure of the communication apparatus may include a processing unit and a communication unit. The processing unit is configured to support the communication apparatus in performing a corresponding function in the foregoing method. The communication unit is configured to support communication between the communication apparatus and another communication apparatus. The communication apparatus may further include a storage unit. The storage unit is configured to be coupled to the processing unit and a sending unit, and the storage unit stores program instructions and data that are necessary for the communication apparatus.

In an implementation, the communication apparatus includes:
  a communication unit, configured to receive second information and uplink data, where the uplink data is received in a second access mode; and
  a processing unit, configured to determine a first access mode based on the second information, where the first access mode is an access mode used by a terminal to send the uplink data before the terminal sends the uplink data in the second access mode.

In addition, for various optional implementations of the information transmission method in this aspect, refer to related content of the second aspect. Details are not described herein again.

In an example, the processing unit may be a processor, the communication unit may be a transceiver or a communication interface, and the storage unit may be a memory.

In an implementation, the communication apparatus includes:
  a transceiver, configured to receive second information and uplink data, where the uplink data is received in a second access mode; and
  a processor, configured to determine a first access mode based on the second information, where the first access mode is an access mode used by a terminal to send the uplink data before the terminal sends the uplink data in the second access mode.

For various optional implementations of the information transmission method in this aspect, refer to related content of the second aspect. Details are not described herein again.

According to a fifth aspect, this application further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the information, the processor outputs the information to a transceiver, so that the transceiver transmits the information. After the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

Based on the foregoing principle, for example, sending the second information and the uplink data mentioned in the foregoing method may be understood as outputting the second information and the uplink data by the processor. For another example, receiving the second information and the uplink data may be understood as receiving the input second information and the input uplink data by the processor.

For operations such as transmission, sending, and receiving related to the processor, if there is no particular statement, or if the operations do not contradict an actual function or internal logic of the operations in related descriptions, the operations may be more generally understood as operations such as input, receiving, and output by the processor, instead of operations such as transmission, sending, and receiving directly performed by a radio frequency circuit and an antenna.

In an implementation process, the processor may be a processor specially configured to perform these methods, or a processor, for example, a general-purpose processor, configured to execute computer instructions in a memory to perform these methods. The memory may be a non-transitory (non-transitory) memory, for example, a read-only memory (Read-Only Memory, ROM). The memory and the processor may be integrated into a same chip, or may be separately disposed on different chips. A type of the memory and a manner of disposing the memory and the processor are not limited in embodiments of this application.

According to a sixth aspect, this application further provides a communication system. The system includes at least one terminal and at least one network device in the foregoing aspects. In another possible design, the system may further include another device interacting with the terminal or the network device in a solution provided in this application.

According to a seventh aspect, this application provides a computer-readable storage medium, configured to store computer software instructions. When the instructions are executed by a communication apparatus, the method according to the first aspect is implemented.

According to an eighth aspect, this application provides a computer-readable storage medium, configured to store computer software instructions. When the instructions are executed by a communication apparatus, the method according to the second aspect is implemented.

According to a ninth aspect, this application further provides a computer program product including instructions. When the computer program product runs on a communication apparatus, the communication apparatus is enabled to perform the method according to the first aspect.

According to a tenth aspect, this application further provides a computer program product including instructions. When the computer program product runs on a communication apparatus, the communication apparatus is enabled to perform the method according to the second aspect.

According to an eleventh aspect, this application provides a chip system. The chip system includes a processor and an interface. The interface is configured to obtain a program or instructions. The processor is configured to invoke the program or the instructions to implement or support a terminal in implementing a function in the first aspect, for example, determining or processing at least one of data and information in the foregoing method. In a possible design, the chip system further includes a memory. The memory is configured to store program instructions and data that are necessary for the terminal. The chip system may include a chip, or may include a chip and another discrete component.

According to a twelfth aspect, this application provides a chip system. The chip system includes a processor and an interface. The interface is configured to obtain a program or instructions. The processor is configured to invoke the program or the instructions to implement or support a network device in implementing a function in the second aspect, for example, determining or processing at least one of data and information in the foregoing method. In a possible design, the chip system further includes a memory. The memory is configured to store program instructions and data that are necessary for the network device. The chip system may include a chip, or may include a chip and another discrete component.

DESCRIPTION OF EMBODIMENTS

The following clearly and completely describes the technical solutions in embodiments of this application with reference to the accompanying drawings in embodiments of this application.

To better understand an information transmission method disclosed in embodiments of this application, a communication system to which embodiments of this application are applicable is first described.

The technical solutions of this application may be applied to various communication systems. For example, the technical solutions of this application may be applied to a global system for mobile communications, a long term evolution (Long Term Evolution, LTE) frequency division duplex system, an LTE time division duplex system, and a universal mobile telecommunications system. With continuous development of communication technologies, the technical solutions in this application may be further applied to a subsequent evolved communication system, for example, a 5th generation (5th-generation, 5G) mobile communication system.

Figure 1:
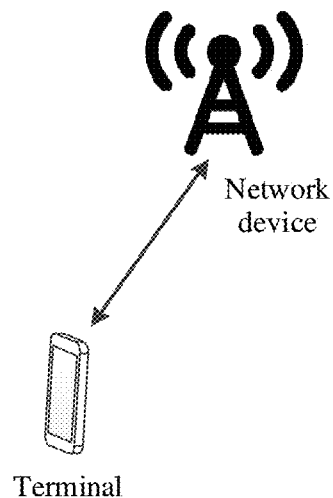
FIG. 1 is a schematic diagram of a structure of a communication system according to an embodiment of this application.

FIG. 1 is a schematic diagram of a structure of a communication system according to an embodiment of this application. The communication system may include but is not limited to one network device and one terminal. Quantities and forms of devices shown in FIG. 1 are used as examples and do not constitute a limitation on embodiments of this application. In actual application, two or more network devices and two or more terminals may be included. The communication system shown in FIG. 1 is described by using an example in which there is one network device and one terminal, and the network device can provide a service for the terminal. In FIG. 1, an example in which the network device is a base station and the terminal is a mobile phone is used.

In this application, a network device is an entity that is on a network side and that is configured to transmit or receive a signal. The network device may be a device having a wireless transceiver function or a chip that can be disposed in the device. The network device includes but is not limited to: an evolved NodeB (evolved NodeB, eNB), a radio network controller (radio network controller, RNC), a NodeB (NodeB, NB), a network device controller (base station controller, BSC), a network device transceiver station (base transceiver station, BTS), a home network device (for example, home evolved NodeB, HNB), or a baseband unit (baseband unit, BBU). Alternatively, the network device may be an access point (access point, AP), a wireless relay node, a wireless backhaul node, a transmission point (transmission and reception point, TRP, or transmission point, TP), or the like in a wireless fidelity (wireless fidelity, Wi-Fi) system. Alternatively, the network device may be a device used in a 4G, 5G, or even 6G system, for example, a gNB or a transmission point (TRP or TP) in an NR system, or one or a group (including a plurality of antenna panels) of antenna panels of a network device in a 4G system. Alternatively, the network node may further be a network node that forms a gNB or a transmission point, for example, a baseband unit (BBU), a distributed unit (distributed unit, DU), a pico network device (Picocell), a femto network device (Femtocell), or a road side unit (road side unit, RSU) in an intelligent driving scenario.

In this application, a terminal is an entity that is on a terminal side and that is configured to receive or transmit a signal. The terminal may also be referred to as user equipment (user equipment, UE), a terminal device, an access terminal, a subscriber unit, a subscriber station, a mobile station, a mobile console, a remote station, a remote terminal, a mobile device, a user terminal, a user agent, or a user apparatus, and may be used in a 4G, 5G, or even 6G system. The terminal in embodiments of this application may be a mobile phone (mobile phone), a tablet computer (Pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), an RSU of the foregoing wireless terminal type, or the like.

For ease of understanding of embodiments disclosed in this application, the following two points are described.

(1) In embodiments disclosed in this application, a scenario of a new radio (New Radio, NR) network in a wireless communication network is used as an example for description. It should be noted that solutions in embodiments disclosed in this application may be further applied to another wireless communication network, and a corresponding name may be replaced with a name of a corresponding function in the another wireless communication network.

(2) In embodiments disclosed in this application, all aspects, embodiments, or features of this application are presented by describing a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

Related concepts in embodiments of this application are then briefly described.

1. Uplink Data

Uplink data includes control plane data (CP data), or uplink data includes control plane data and user plane data (UP data). Based on directions of a data flow and a signaling flow in a network architecture, an NR communication protocol stack is divided into two planes: a user plane and a control plane. User data is transmitted based on a user plane protocol stack, and control signaling of a system is transmitted based on a control plane protocol stack. It may be understood that the control plane data generally refers to the control signaling of the system, for example, an RRC signaling message (a connection establishment request, a connection reply request, or the like) or a system message. To-be-transmitted data of a terminal includes control plane data and user plane data.

2. Access Mode

An access mode refers to a mode that needs to be used when a terminal starts to attempt to access a network, perform a cell handover, or the like. To improve uplink data transmission efficiency, especially for a small-packet data service, a wireless communication network starts to support a transmission solution in which uplink data is carried in a random access process. In solutions of this application, the access mode refers to a random access mode in a broad sense. In addition to random access, the access mode further refers to a data transmission mode in which the uplink data can be carried. That is, the access mode includes the random access mode and/or another data transmission mode. Random access modes include four-step random access (4-step physical random access channel, 4-step RACH), early data transmission (early data transmission, EDT), two-step random access (2-step physical random access channel, 2-step RACH), and two-step random access with user plane data (2-step RACH with user plane data, 2-step RACH with UP data). Other data transmission modes include contention-free configured grant transmission (contention-free configured grant transmission, contention-free CG) and contention-based configured grant transmission (contention-based configured grant transmission, contention-based CG). In embodiments of this application, a type of the access mode is not limited to the foregoing access modes.

Figure 2A:
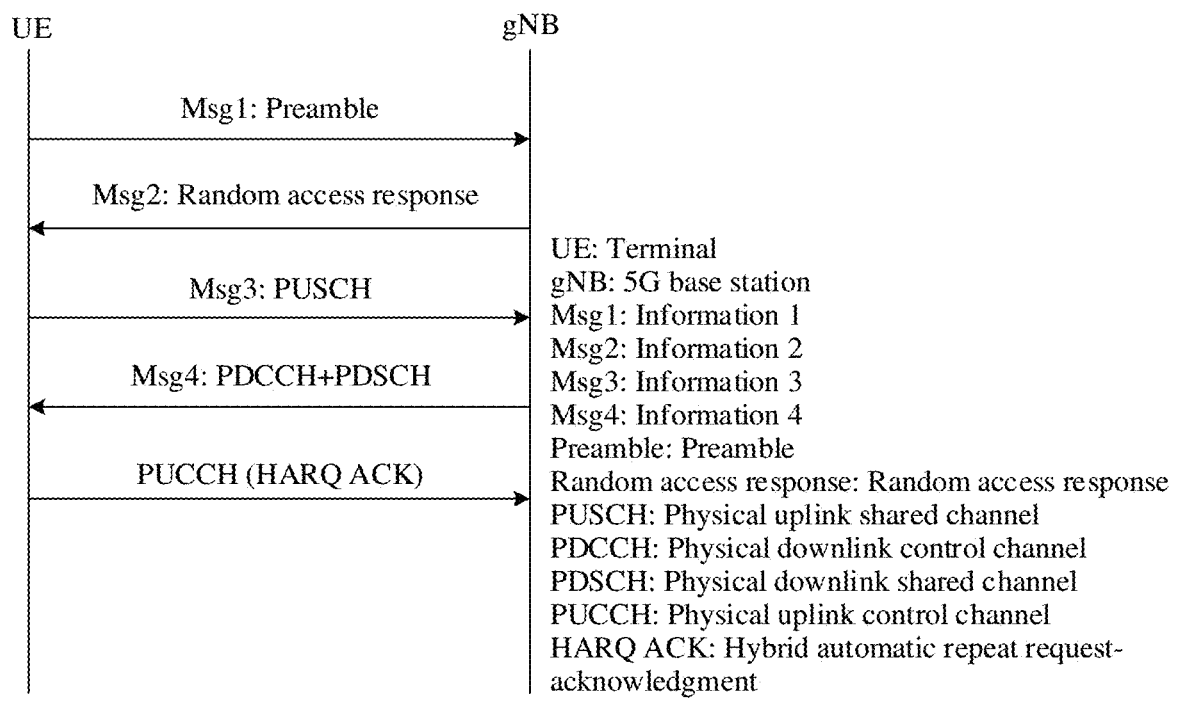
FIG. 2a is a schematic flowchart of a current four-step random access method.

4-step RACH: A 4-step RACH procedure is shown in FIG. 2a, and includes: A terminal sends a Msg1 to a network device, where the network device herein is a gNB, the Msg1 is a random access preamble, and the preamble is used to request access. The network device receives the Msg1, and sends a Msg2 to the terminal when successfully detecting the preamble, where the Msg2 includes a random access response. When receiving the Msg2 and successfully determining the random access response, the terminal sends a Msg3 to the network device to request a connection, where the Msg3 is a physical uplink shared channel (physical uplink shared channel, PUSCH), and the PUSCH carries uplink data. The network device sends a Msg4 to the terminal when receiving the Msg3 and successfully decoding the uplink data in the Msg3, where the Msg4 includes a physical downlink control channel (physical downlink control channel, PDCCH) and a physical downlink shared channel (physical downlink shared channel, PDSCH), and the Msg4 is used to notify the terminal that a contention resolution for the Msg3 is successful and the connection is established. The terminal sends a physical uplink control channel (physical uplink control channel, PUCCH) to the network device when receiving the Msg4 and determining that the contention resolution carried in the Msg4 is successful, where the PUCCH carries a HARQ-ACK, and the HARQ-ACK is used by the terminal to confirm, to the network device, that random access succeeds.

Figure 2B:
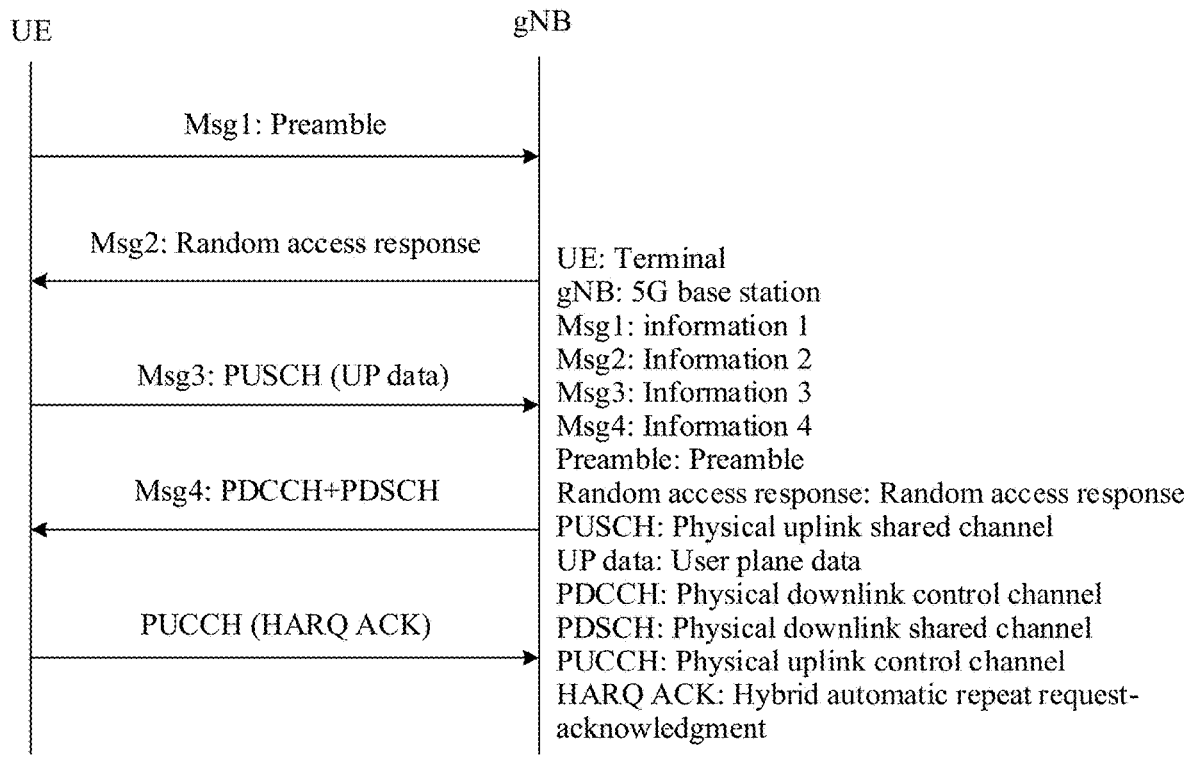
FIG. 2b is a schematic flowchart of a current early data transmission method.

EDT: EDT is a transmission scheme in which UP data is carried in a random access process. An EDT procedure is shown in FIG. 2b. It can be learned from FIG. 2b that a difference between the EDT and 4-step RACH is as follows. In the EDT, a PUSCH carries uplink data. In addition to a connection establishment request (which may be understood as control plane data), the uplink data further includes UP data, in other words, when sending a Msg3, the terminal may also send the UP data. In comparison with a mode in which a terminal sends UP data after successfully accessing a network by using the 4-step RACH, in this mode, the UP data is sent in a connection establishment process, so that transmission efficiency of the UP data can be improved.

Figure 2C:
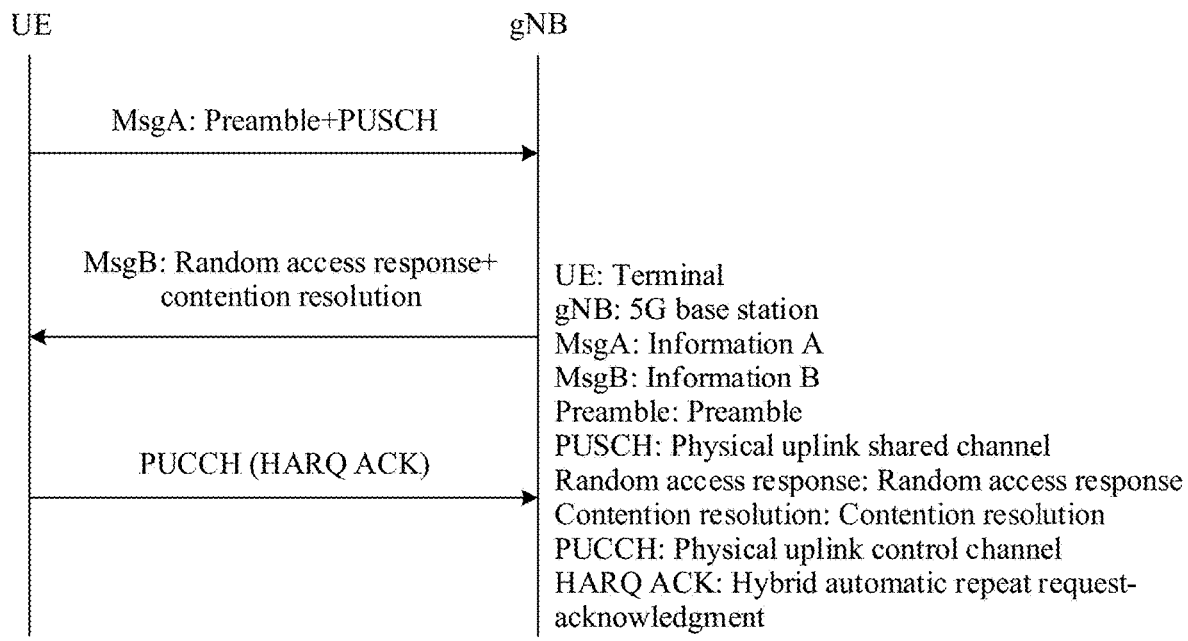
FIG. 2c is a schematic flowchart of a current two-step random access method.

2-step RACH: 2-step RACH is a random access mode proposed to meet a low-latency requirement for data transmission. As shown in FIG. 2c, a 2-step RACH procedure includes: A terminal sends a MsgA, where the MsgA includes a preamble and a PUSCH, in other words, a process in which the terminal sends the MsgA by using the 2-step RACH is equivalent to a process in which the terminal combines and sends a Msg1 and a Msg3 in 4-step RACH. The terminal receives a MsgB, where the MsgB is response information of a network device to the MsgA, and the MsgB includes at least one of the following responses: a response of the network device to the preamble and a response of the network device to the PUSCH.

In a case, as shown in FIG. 2c, if a network device successfully detects a preamble and successfully decodes uplink data on a PUSCH, a sent MsgB includes a response to the PUSCH, that is, the MsgB includes a random access response and contention resolution information. This process is referred to as a success random access response (success random access response, successRAR). After determining that the contention resolution carried in the successRAR is correct, a terminal sends a HARQ-ACK to the network device to determine that random access succeeds.

Figure 2D:
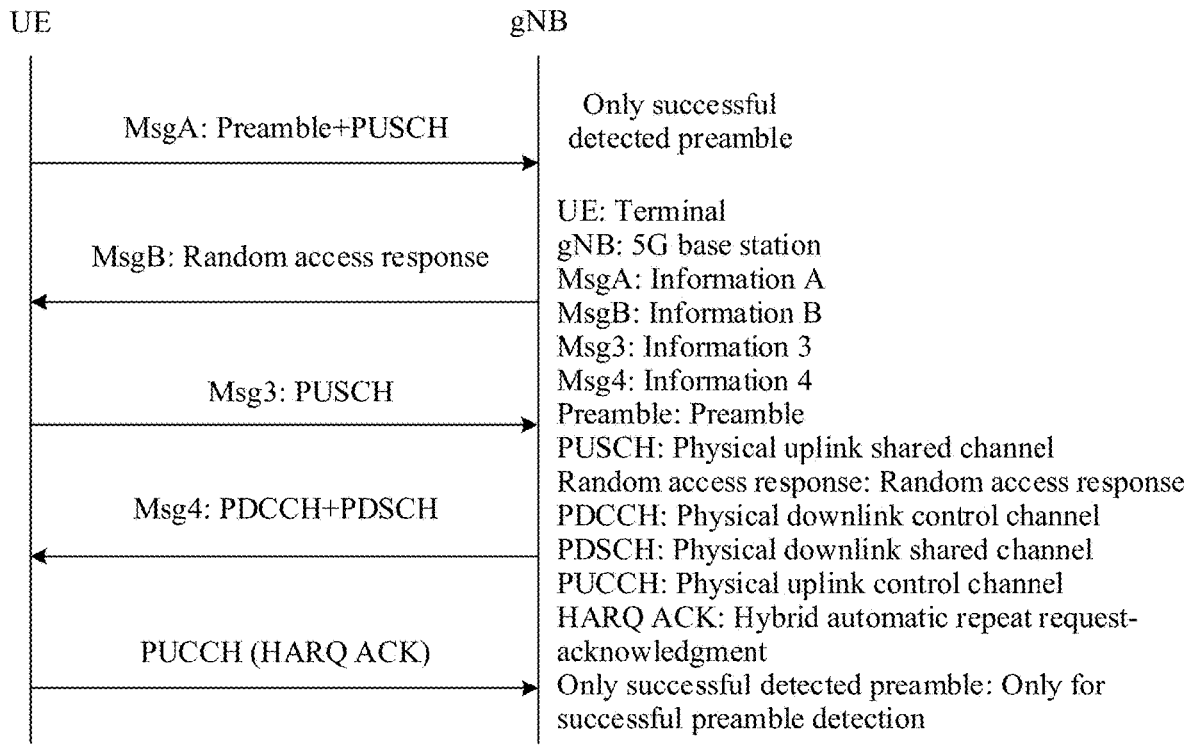
FIG. 2d is a schematic flowchart of a current fallback two-step random access method.

In another case, as shown in FIG. 2d, if a network device successfully detects a preamble but fails to decode uplink data on a PUSCH, a sent MsgB includes only a response to the preamble, in other words, the MsgB includes only a random access response. This process is referred to as a fallback random access response (fallback random access response, fallbackRAR). When receiving the MsgB, a terminal sends a Msg3 to the terminal based on a UL grant indication in the fallbackRAR. The Msg3 is a PUSCH, and uplink data carried on the PUSCH is uplink data carried on a PUSCH in a MsgA. After receiving the Msg3 and successfully decoding the uplink data on the PUSCH in the Msg3, the network device sends a Msg4 to the terminal. After receiving the Msg4 and determining that contention resolution carried in the Msg4 is correct, the terminal sends a HARQ-ACK to the network device to determine that random access succeeds. This process is referred to as a fallback 2-step RACH process. To be specific, this process is a process in which a terminal falls back to send a Msg3 by using the 4-step RACH when the terminal fails to send the uplink data by using the 2-step RACH.

Figure 2E:
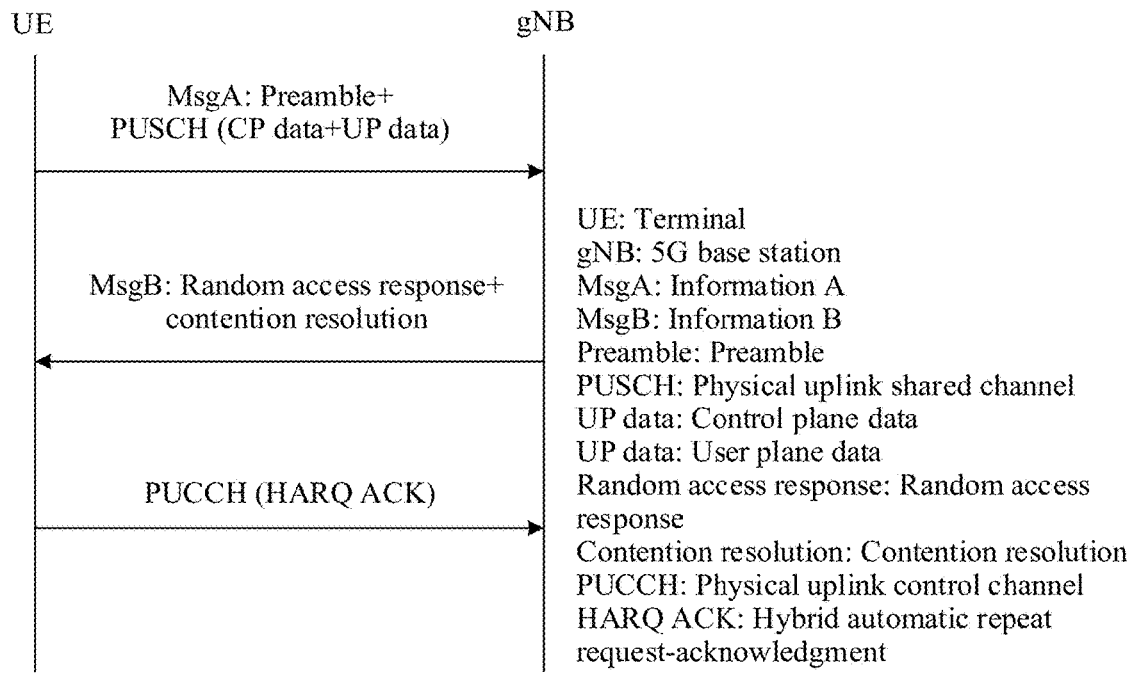
FIG. 2e is a schematic flowchart of a current two-step random access method with user plane data.

2-step RACH with UP data: In a current 3GPP Release 15 (Rel-15) protocol, a MsgA in the 2-step RACH is used to carry CP data, for example, to carry an RRC connection establishment request (radio resource control connection establishment request) or an RRC connection resume request (radio resource control connection resume request). In a subsequent protocol, the MsgA may simultaneously carry CP data and UP data to improve transmission efficiency of small-packet data. Therefore, as shown in FIG. 2e, the 2-step RACH in which the MsgA carries both CP data and UP data is referred to as the 2-step RACH with UP data. However, a name of the access mode is not limited in embodiments of this application. For example, the access mode may also be referred to as two-step random access that is based on user plane data.

Figure 2F:
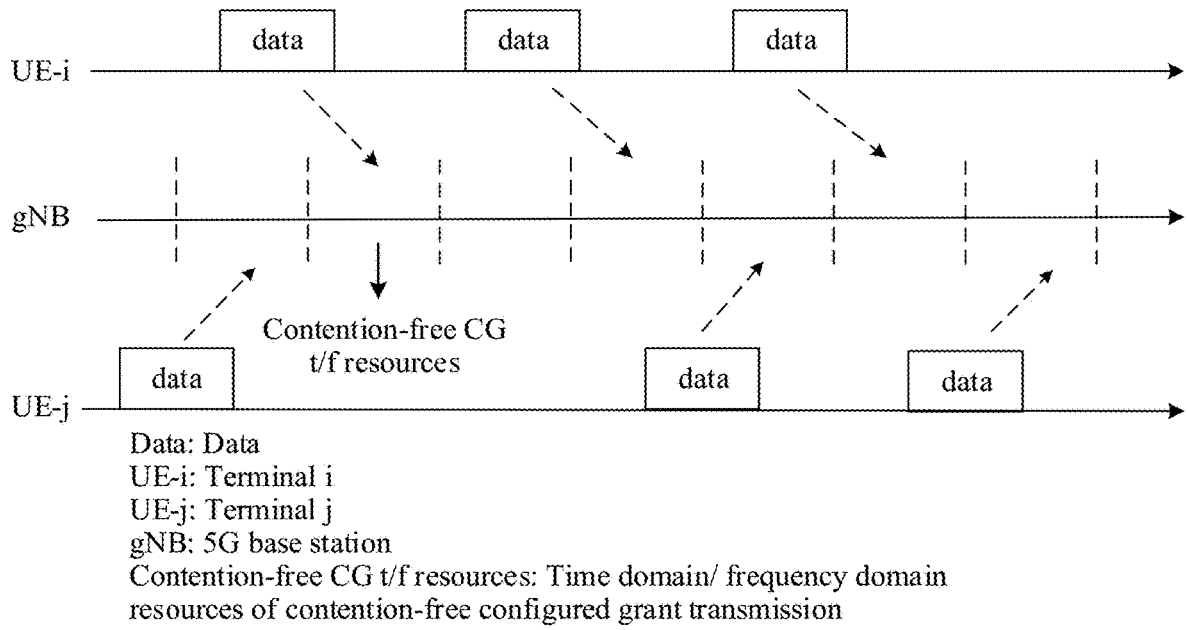
FIG. 2f is a schematic flowchart of a current contention-free configured grant transmission method.

Contention-free CG: When a data packet arrives at a terminal, the terminal initiates data transmission on a resource configured on a network side. The resource is a resource that is configured by a network device for the terminal in advance and that is used to perform contention-free configured grant transmission. FIG. 2f is a schematic diagram of the contention-free configured grant transmission. In the contention-free configured grant transmission, for different terminals, transmission resources and parameter configuration information that are of the terminals and that are sent by the network device are user-specific (UE-specific) configurations, that is, a transmission resource and parameter configuration information received by each terminal is specific for a single terminal. In an example of the contention-free configured grant transmission, pilots of different terminals are orthogonal, and no pilot collision occurs between the different terminals. Alternatively, time-frequency resources of different terminals are orthogonal, and no time-frequency resource collision occurs between the different terminals.

Contention-based CG: When a data packet arrives at a terminal, the terminal may alternatively initiate data transmission on a resource configured on a network side. The resource is a resource that is configured by a network device for the terminal in advance and that is used to perform contention-based configured grant transmission. Time-frequency resources or pilots of different terminals may collide with each other. To be specific, the terminal randomly selects a time-frequency resource or a pilot from the resource, and different terminals may contend for a same time-frequency resource or pilot. As a result, a time-frequency resource collision or a pilot collision occurs. Consequently, a probability of successful access for the contention-based configured grant transmission is less than a probability of successful access for the contention-free configured grant transmission. A name of the access mode is not limited in embodiments of this application. For example, the access mode may also be referred to as carried-contention-based configured grant transmission.

3. Maximum Quantity of Access Times

A maximum quantity of access times is configured by a network device for a terminal, and is a maximum quantity of times that the terminal may send uplink data in an access mode. The maximum quantity of access times may also be referred to as a maximum quantity of access attempts. If the terminal supports a plurality of access modes, the network device may configure, for the terminal, a maximum quantity of access times for each access mode. If a quantity of attempts of sending the uplink data in one access mode by the terminal reaches the maximum quantity of access times of the access mode, but the terminal still fails to send the uplink data, the terminal cannot continue to send the uplink data in this mode. In this case, the terminal may attempt to send the uplink data in another access mode. That the terminal fails to send the uplink data in a first access mode means that when a quantity of times of sending the uplink data in the first access mode by the terminal reaches a maximum quantity of access times of the first access mode, the terminal still does not receive acknowledgment information sent by the network device for the uplink data. The acknowledgment information may be contention resolution information of the network device for the uplink data, or the acknowledgment information is acknowledgment information indicating that the network device successfully decodes the uplink data. If the terminal accesses a network in the first access mode, when successfully decoding the uplink data sent by the terminal, the network device sends the contention resolution information to the terminal. In this case, the acknowledgment information is the contention resolution information. If the terminal transmits data in the first access mode, when successfully decoding the uplink data sent by the terminal, the network device sends, to the terminal, the acknowledgment information indicating that the network device successfully decodes the uplink data. In this case, the acknowledgment information is the acknowledgment information indicating that the network device successfully decodes the uplink data.

4. First Information, Second Information, and Third Information

First information is information indicating that a current access mode is an initial access mode. Second information is information indicating a first access mode. Third information is information indicating quantities of times of sending uplink data in the first access mode and in a second access mode. The quantities of times that a terminal sends the uplink data in the first access mode and in the second access mode may also be referred to as quantities of attempts of sending the uplink data in the first access mode and in the second access mode by a terminal.

A name of the foregoing information is not limited in embodiments of this application. For example, the second information may also be referred to as fallback information, a fallback identifier, or the like.

5. Resource Configuration Information of an Access Mode

Resource configuration information of an access mode is configured by a network device for the access mode, and refers to a resource used by a terminal for access or data transmission. For example, the resource configuration information of an access mode may include one or more of the following: initial transmit power of a preamble, a transmission resource, a quantity of terminals that are allowed for access, or the like. A parameter included in the resource configuration information is not limited in embodiments of this application.

A technical problem to be resolved in this application is briefly described again.

To improve a probability of successful access or successful transmission of small-packet data by a terminal, when the terminal selects an access mode to transmit uplink data, if the terminal does not receive an acknowledgment message from the network device for uplink data, the terminal may attempt to transmit the uplink data for a plurality of times. In an uplink data transmission process, the network device cannot learn of a quantity of attempts of the terminal device. Consequently, a sending resource of the terminal cannot be adjusted in a timely manner. Currently, if access is performed in one access mode, a manner of optimizing access efficiency of a terminal is as follows: The terminal reports a quantity of access attempts in the access mode. A network device then learns of resource usage of the access mode based on the quantity of access attempts, so that access efficiency of the access mode may be improved by adjusting resource configuration information of the access mode.

However, if access or data transmission is performed in a plurality of access modes, when a quantity of times that the terminal sends the uplink data in an access mode reaches a maximum quantity of access times of the access mode, but the terminal still fails to send the uplink data in the access mode, a terminal may attempt to send uplink data in another access mode. A quantity of access attempts of the terminal is a total quantity of times. To be specific, regardless of a quantity of access modes used, a quantity of access attempts or data transmission attempts is continuously counted, and a specific quantity of access or data transmission times of each access mode is not distinguished. Consequently, resource configuration information adjusted by the network device based on the total quantity of times may be inappropriate, and access efficiency or data transmission efficiency cannot be optimized. In addition, the network device cannot learn whether a motivation for the terminal to use a current access mode is initial selection or is re-selection performed when the uplink data fails to be sent in another access mode. As a result, the network device cannot learn of resource usage of the access mode, and further, the access efficiency or the data transmission efficiency of the terminal cannot be improved.

For example, when a quantity of times that the terminal sends a MsgA by using 2-step RACH reaches a maximum quantity of access times configured for 2-step RACH, and the network device still cannot correctly decode uplink data carried in the MsgA, in other words, the access still fails, the terminal may send a Msg1 by using 4-step RACH. After receiving a random access response that corresponds to the Msg1 and that is sent by the network device, the terminal sends the uplink data based on a time-frequency resource determined by a UL grant in the random access response. In this case, the network device cannot learn whether a motivation for the terminal to use 4-step RACH is initial selection or is re-selection performed when the terminal fails to access the network by using 2-step RACH.

As a result, for the foregoing scenario in which network access or data transmission is performed in a plurality of access modes, how to improve the access efficiency or the data transmission efficiency of the terminal becomes an urgent problem to be resolved.

To resolve the foregoing problem, embodiments of this application provide an information transmission method.

The following describes embodiments of this application with reference to the accompanying drawings.

Figure 3A:
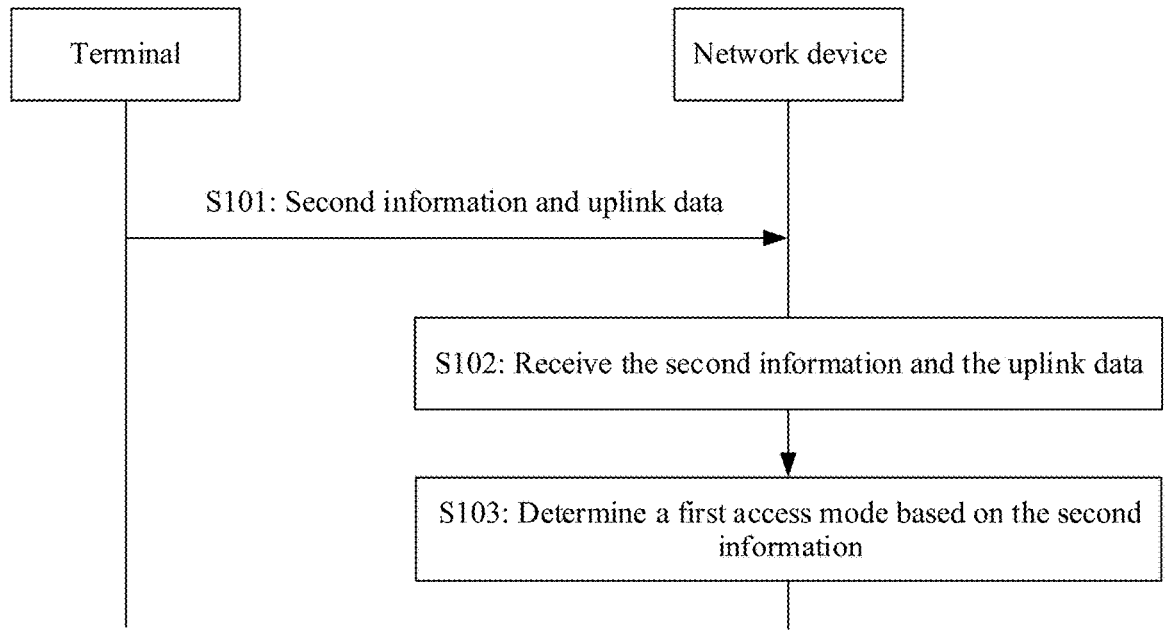
FIG. 3a is a schematic flowchart of an information transmission method according to an embodiment of this application.

FIG. 3a is a schematic flowchart of an information transmission method 100 according to an embodiment of this application. The information transmission method 100 is described from a perspective of interaction between a terminal and a network device. The information transmission method 100 includes but is not limited to the following steps.

S101: The terminal sends second information and uplink data.

The second information indicates a first access mode, and the first access mode is an access mode that is used by the terminal to send the uplink data before the terminal sends the uplink data in a second access mode. The uplink data sent in step S101 is sent by the terminal in the second access mode.

The uplink data sent by the terminal in the second access mode is uplink data sent by the terminal in the first access mode. Alternatively, the uplink data sent by the terminal in the second access mode is a part of uplink data sent by the terminal in the first access mode. The uplink data is not limited in this embodiment of this application.

For example, the uplink data sent by the terminal in the first access mode includes CP data and UP data, and the uplink data sent by the terminal in the second access mode includes the CP data.

S102: The network device receives the second information and the uplink data.

The uplink data is received in the second access mode.

S103: The network device determines the first access mode based on the second information.

In an implementation, both the second information and the uplink data are located on a PUSCH. The terminal sends the second information and the uplink data to the network device through the PUSCH by using the second access mode, so that the network device directly learns of, from the second information, the access mode used by the terminal to send the uplink data before the terminal sends the uplink data in the second access mode. In an implementation, channel coding is jointly performed for the second information and the uplink data that are used as one transport block.

In another implementation, the second information is carried in uplink control information (uplink control indicator, UCI). The UCI and the uplink data are located on the PUSCH. The terminal sends the UCI and the uplink data to the network device through the PUSCH by using the second access mode, so that the network device learns of, from the second information in the UCI, the access mode used by the terminal to send the uplink data before the terminal sends the uplink data in the second access mode. In an implementation, channel coding is separately performed for the UCI and the uplink data, and both the UCI and the uplink data are transmitted on the PUSCH.

In another implementation, the second information is carried in the UCI, the UCI is located on an uplink control channel (physical uplink control channel, PUCCH), and the uplink data is located on the PUSCH. The terminal separately sends the UCI and the uplink data to the network device through the PUCCH and the PUSCH by using the second access mode, so that the network device learns of, from the second information carried in the UCI, the access mode used by the terminal to send the uplink data before the terminal sends the uplink data in the second access mode.

It can be learned that in this embodiment of this application, when sending the uplink data by using the second access mode, the terminal also sends the second information to the network device, so that the network device learns that the access mode used by the terminal is the second access mode. The network device can also learn of, based on the second information, a motivation for the terminal to use the second access mode is re-selection performed when a quantity of times for the terminal to send the uplink data in the first access mode indicated by the second information reaches a maximum quantity of access times but the uplink data still fails to be sent. This helps the network device optimize resource configuration information of the first access mode, to improve access efficiency or data transmission efficiency of the terminal.

In addition, in this embodiment of this application, the second information is used to notify the network device that the terminal cannot successfully access the network or successfully transmit the uplink data in the first access mode. This helps the network device optimize the resource configuration information of the first access mode in a targeted manner, improves the access efficiency or the data transmission efficiency of the terminal, and helps the network device adjust resource configuration information of different access modes.

Figure 3B:
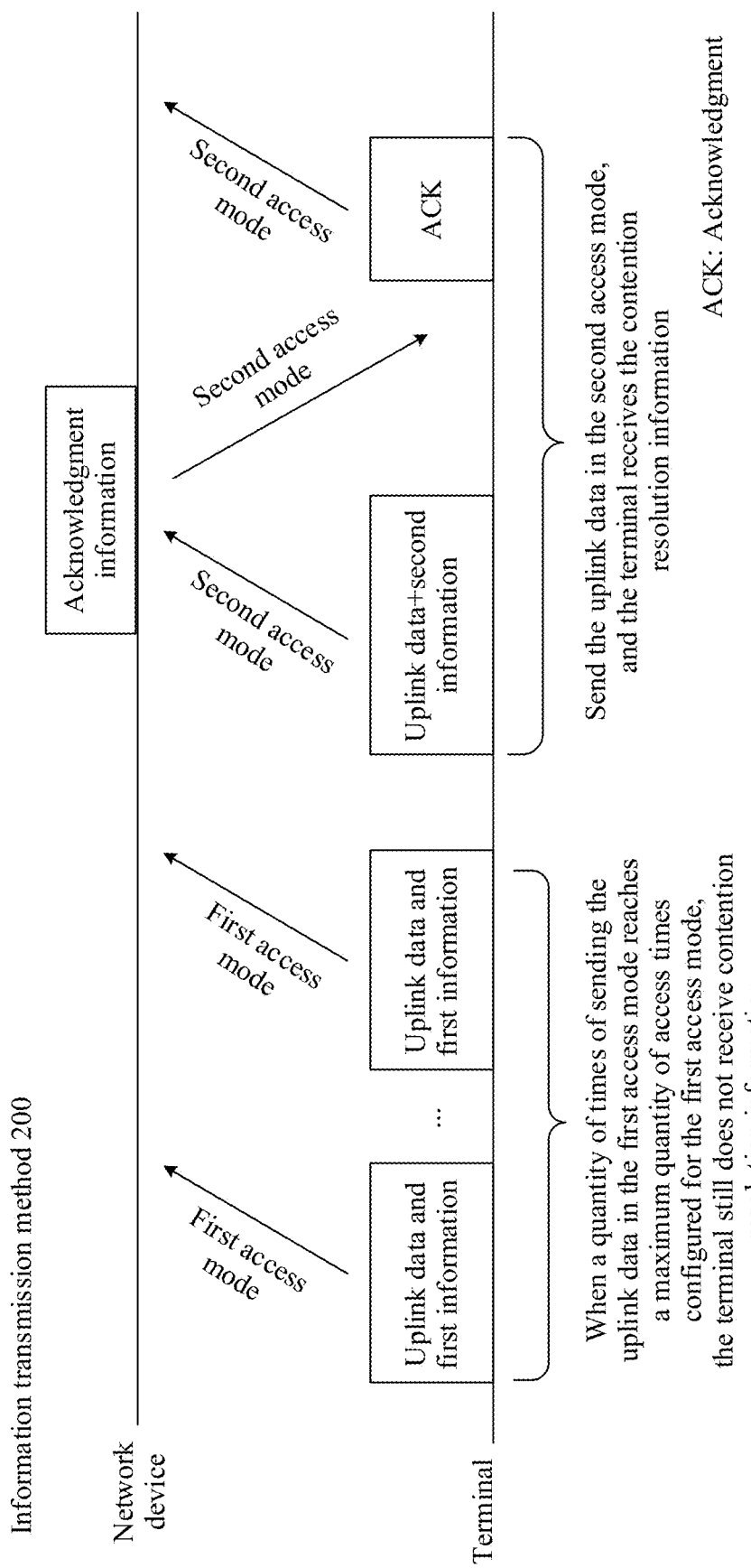
FIG. 3b is a schematic diagram of another information transmission method according to an embodiment of this application.

FIG. 3b is a schematic flowchart of another information transmission method 200 according to an embodiment of this application. The information transmission method 200 is also described from a perspective of interaction between a terminal and a network device and by using an example in which the terminal successfully performs access by using a first access mode and a second access mode. The information transmission method 200 includes but is not limited to the following steps.

S201: The terminal sends uplink data by using the first access mode, and if no acknowledgment information from the network device is received when a quantity of times for the terminal to send uplink data in the first access mode reaches a maximum quantity of access times, step S202 is performed.

Optionally, the terminal may determine, by not receiving other information returned from the network device, that access or data transmission in the first access mode fails, and perform step S202.

In an implementation, for example, in step 201, when sending the uplink data by using the first access mode, the terminal further sends first information, where the first information indicates that a current access mode is an initial access mode. This helps the network device learn that a motivation for the terminal to use the first access mode is initial selection. This further helps optimize resource configuration information of the first access mode. In addition, with reference to second information sent in step S203, the network device further needs to receive the first information or the second information in addition to the uplink data sent by the terminal. This implementation helps improve compatibility of the network device with two access modes.

In another implementation, in step 201, when sending the uplink data in the first access mode, the terminal may not send first information, where the first information indicates that the current access mode is the initial access mode, to help reduce signaling overheads.

S202: The terminal sends the second information and the uplink data by using the second access mode.

S203: The network device receives the second information and the uplink data by using the second access mode.

S204: The network device sends the acknowledgment information by using the second access mode.

S205: The network device determines the first access mode based on the second information.

S206: The terminal receives the acknowledgment information, and sends an acknowledgment (ACK) to the network device.

S204 and S206 are optional steps.

It can be learned that in this embodiment of this application, when a quantity of times for the terminal to send the uplink data reaches a maximum quantity of access times but the acknowledge information is still not received, the terminal may send the uplink data and the second information in the second access mode, so that the network device learns, based on the second information, that an access mode used by a terminal device to send the uplink data before the terminal sends the uplink data in the second access mode is the first access mode. This helps optimize the resource configuration information of the first access mode, and improve access efficiency or data transmission efficiency of the terminal.

In an implementation, in the information transmission methods 100 and 200, when the terminal sends the uplink data by using the second access mode, the terminal may further send third information, where the third information indicates quantities of times that a terminal sends the uplink data in the first access mode and in the second access mode, so that the network device also learns of a total quantity of access times or data transmission times for the terminal before an access or data transmission success. When the terminal sends the uplink data in the first access mode for a maximum quantity of access times configured by the network device, but the uplink data still fails to be sent, the terminal sends the uplink data in the second access mode. Therefore, the network device subtracts a maximum quantity of access times of the first access mode from the total quantity of times that the terminal sends the uplink data in the first access mode and in the second access mode, to obtain a quantity of attempts for the terminal to send the uplink data by using the second access mode, so that the terminal learns of, based on the quantity of attempts, resource usage of the second access mode. This helps optimize resource configuration information of the second access mode.

For example, the first access mode is contention-based CG, and the second access mode is a 4-step RACH. To be specific, when the terminal fails to send the uplink data by using the contention-based CG, the terminal sends the uplink data by using the 4-step RACH. The configuration information sent by the network device to the terminal includes the maximum quantity of access times and a maximum quantity of access times of the contention-based CG, where the maximum quantity of access times of the contention-based CG is less than or equal to the maximum quantity of access times, and the maximum quantity of access times of the contention-based CG is a part of the maximum quantity of access times. Optionally, the network device may set a first threshold, where the first threshold is less than or equal to the maximum quantity of access times. When the quantity of attempts for the terminal to send the uplink data by using the 4-step RACH is greater than the first threshold, the network device may adjust resource configuration of the 4-step RACH.

Specifically, for example, the maximum quantity of access times configured by the network device for the terminal is 16, and a maximum quantity of the contention-based CG configured by the network device for the terminal is 4. To be specific, when the terminal fails to send the uplink data by using the contention-based CG, the maximum quantity of attempts for the terminal to send the uplink data by using the 4-step RACH is 12. Optionally, the network device sets the first threshold to 4. If the network device learns, based on the third information, that the quantity of attempts for the terminal to send the uplink data by using the contention-based CG and the 4-step RACH is 9, the network device may learn that the quantity of attempts for the terminal to send the uplink data by using the 4-step RACH is 5, which is greater than the first threshold. In this case, the network device learns that initial transmit power on the 4-step RACH is insufficient, or a small quantity of resources are configured for the 4-step RACH. Consequently, the network device may indicate the terminal to increase initial transmit power of a preamble on the 4-step RACH, to improve a success rate of detecting the preamble on the 4-step RACH, adding a 4-step RACH resource, so as to increase a success rate of access or data transmission performed by the terminal in the second access mode.

In an optional implementation, in the information transmission method 100 and the information transmission method 200, the network device may further adjust the resource configuration information of the first access mode, so as to help optimize resource configuration information of the first access mode and improve access efficiency or data transmission efficiency of the terminal. The network device may optimize one or more of the following parameters in the resource configuration information: initial transmit power of a preamble, a transmission resource, a quantity of terminals that are allowed for access, or the like.

For example, if a plurality of terminals all send the second information and the uplink data, and all use the second information to indicate that the terminal fails to send the uplink data in the first access mode, the network device may learn of a quantity of terminals that fail to perform access in the first access mode. Further, the network device may learn of, based on the quantity of terminals and a quantity of terminals that are detected to send the uplink data in the first access mode, resource usage of the first access mode. If the quantity of terminals that fail to perform access in the first access mode is greater than a second threshold, and the quantity of terminals that are detected and that send the uplink data in the first access mode is less than a third threshold, it indicates that current resources of the first access mode are sufficient, but initial transmit power of the first access mode is insufficient, and the initial transmit power of the first access mode needs to be increased, so as to increase a success rate of detecting the preamble of the first access mode by the network device. Alternatively, if the quantity of terminals that fail to perform access in the first access mode is greater than the second threshold, and the quantity of terminals that are detected and that send the uplink data in the first access mode is greater than the third threshold, it indicates that the current resources of the first access mode are insufficient, and the resources of the first access mode need to be increased, so as to improve access efficiency or data transmission efficiency of the terminal.

The following describes the information transmission method with reference to a specific access mode or data transmission mode. In addition, for ease of description, a process in which a terminal attempts to send uplink data in a second access mode when failing to send the uplink data in a first access mode may be referred to as fallback (fallback) from the first access mode to the second access mode.

An embodiment of this application provides an information transmission method 300 by using an example in which a first access mode is one of the following: contention-free CG, contention-based CG, or a 2-step RACH, and a second access mode is a 4-step RACH. An embodiment of this application provides an information transmission method 400 by using an example in which a first access mode is one of the following: contention-free CG, contention-based CG, or a 2-step RACH with UP data, and a second access mode is EDT. An embodiment of this application provides an information transmission method 500 by using an example in which a first access mode is one of the following: contention-free CG or contention-based CG, and a second access mode is a 2-step RACH. The following provides corresponding descriptions with reference to the accompanying drawings and an index table of second information.

Figure 3C:
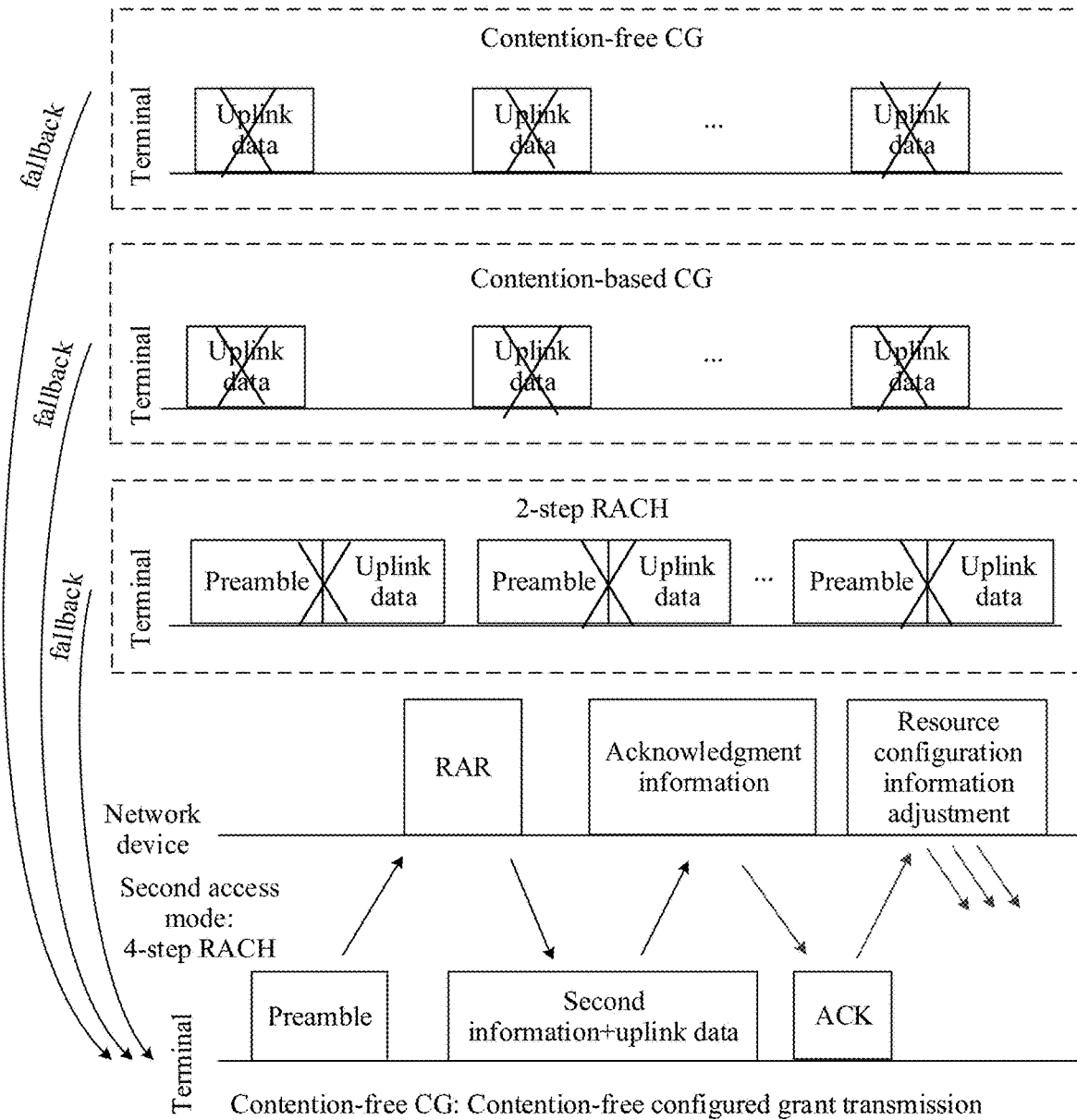
FIG. 3c is a schematic diagram of still another information transmission method according to an embodiment of this application.

The information transmission method 300 is shown in FIG. 3c. When a terminal fails to send uplink data in one of three access modes: the contention-free CG, the contention-based CG, or the 2-step RACH, the terminal may fall back to the 4-step RACH. When sending a preamble by using a 4-step RACH process, and receiving random access response information returned for the preamble by a network device, the terminal sends second information and the uplink data to the network device based on a resource indicated by a UL grant in a response message.

Optionally, as shown in FIG. 3c, the information transmission method 300 further includes: The network device adjusts resource configuration information of the first access mode, and sends the adjusted resource configuration information to the terminal, so that the resource configuration information of the first access mode is optimized, and access efficiency or data transmission efficiency of the terminal is improved.

With reference to indexes in Table 1, the second information may indicate that the first access mode is one of the following: the contention-free CG, the contention-based CG, or the 2-step RACH.

TABLE 1

| Index | Description |
|-------|-------------|
| 00 | The first access mode is the contention-based CG |
| 01 | The first access mode is the contention-free CG |
| 10 | The first access mode is the 2-step RACH |
| 11 | Reserved |

For example, if the index in the second information sent by the terminal by using the 4-step RACH is 00, the network device may learn that an access mode used by the terminal to send the uplink data before the terminal sends the uplink data by using the 4-step RACH is the contention-based CG. In this way, the network device can learn that, as shown in FIG. 3c, a motivation for the terminal to use the 4-step RACH is not initial selection, but is selection performed when the terminal falls back from the contention-based CG. This helps the network device optimize resource configuration information of the contention-based CG, and improve access efficiency or data transmission efficiency of the terminal.

For another example, if the index in the second information sent by the terminal by using the 4-step RACH is 01, the network device may learn that an access mode used by the terminal to send the uplink data before the terminal sends the uplink data by using the 4-step RACH is the contention-free CG. In this way, the network device can learn that, as shown in FIG. 3c, a motivation for the terminal to use the 4-step RACH is not initial selection, but is selection performed when the terminal falls back from the contention-free CG. This helps the network device optimize resource configuration information of the contention-free CG, and improve access efficiency or data transmission efficiency of the terminal.

For still another example, if the index in the second information sent by the terminal by using the 4-step RACH is 10, the network device may learn that an access mode used by the terminal to send the uplink data before the terminal sends the uplink data by using the 4-step RACH is the 2-step RACH. In this way, the network device can learn that, as shown in FIG. 3c, a motivation for the terminal to use the 4-step RACH is not initial selection, but is selection performed when the terminal falls back from the 2-step RACH. This helps the network device optimize resource configuration information of the 2-step RACH, and improve access efficiency or data transmission efficiency of the terminal.

In addition, descriptions corresponding to the index 11 in Table 1 may be "reserved". Optionally, the index 11 may be used to describe another subsequent access mode.

In another implementation, it is similar to the step S201 of the foregoing information transmission method 200 that, first information may be combined with second information and use an index similar to that shown in Table 1 to indicate whether a current access mode is an initial access mode, or indicate a specific access type of the first access mode. For example, as shown in Table 2, an index sent by the terminal is 00, and then the network device may learn that the current access mode used by the terminal is the initial access mode.

For a specific operation in which the terminal sends the second information based on Table 2 and the network device interprets the second information based on Table 2 to learn of the first access mode, refer to descriptions about Table 1. Details are not described herein again.

TABLE 2

| Index | Description |
|-------|-------------|
| 00 | The current access mode is the initial access mode |
| 01 | The first access mode is the contention-based CG |
| 10 | The first access mode is the contention-free CG |
| 11 | The first access mode is the 2-step RACH |

In an implementation, the first access mode in the information transmission method 300 is one of the following: the contention-based CG or the 2-step RACH. Correspondingly, with reference to indexes in Table 3, the second information may indicate that the first access mode is one of the following: the contention-based CG or the 2-step RACH. In addition, the first information may be combined with the second information and use an index to indicate whether the current access mode is the initial access mode, or indicate a specific access type of the first access mode. In this way, as shown in Table 3, descriptions of an index 00 is that the current access mode used by the terminal is the initial access mode. To be specific, when the uplink data is sent in the first access mode, the sent first information may be 00.

In another implementation, the terminal may not send the first information when the uplink data is sent in the first access mode. In this case, when the index in Table 3 is 00, the index may be used to describe a specific type of the first access mode, for example, the contention-based CG. Correspondingly, descriptions corresponding to another index may be correspondingly adjusted.

In addition, descriptions corresponding to an index 11 in Table 3 may be "reserved". Optionally, the index 11 may be used to describe another subsequent access mode.

For a specific operation in which the terminal sends the second information based on Table 3 and the network device interprets the second information based on Table 3 to learn of the first access mode, refer to descriptions about Table 1. Details are not described herein again.

TABLE 3

| Index | Description |
|---|---|
| 00 | The current access mode is the initial access mode |
| 01 | The first access mode is the contention-based CG |
| 10 | The first access mode is the 2-step RACH |
| 11 | Reserved |

In another implementation, the first access mode in the information transmission method 300 is one of the following: the contention-free CG, the contention-based CG, the 2-step RACH, or a 2-step RACH with UP data. With reference to indexes in Table 4, the second information may indicate that the first access mode is one of the following: the contention-free CG, the contention-based CG, the 2-step RACH, or the 2-step RACH with UP data. In addition, the first information may be combined with the second information and use an index to indicate whether the current access mode is the initial access mode, or indicate a specific access type of the first access mode. In this way, as shown in Table 4, descriptions of an index 000 is that the current access mode used by the terminal is the initial access mode. To be specific, when the uplink data is sent in the first access mode, the sent first information may be 000.

In another implementation, the terminal may not send the first information when the uplink data is sent in the first access mode. In this case, when the index in Table 4 is 000, the index may be used to describe a specific type of the first access mode, for example, the contention-based CG. Correspondingly, descriptions corresponding to another index may be correspondingly adjusted.

In addition, descriptions corresponding to an index 101-111 in Table 4 may be "reserved". Optionally, the index 101-111 may be used to describe another subsequent access mode.

For a specific operation in which the terminal sends the second information based on Table 4 and the network device interprets the second information based on Table 4 to learn of the first access mode, refer to descriptions about Table 1. Details are not described herein again.

TABLE 4

| Index | Description |
|---|---|
| 000 | The current access mode is the initial access mode |
| 001 | The first access mode is the contention-free CG |
| 010 | The first access mode is the contention-based CG |
| 011 | The first access mode is the 2-step RACH |
| 100 | The first access mode is the 2-step RACH with UP data |
| 101-111 | Reserved |

In this embodiment of this application, the index in the second information shown in Table 4 occupies three bits. In comparison with the second information in Table 1, Table 2, and Table 3, the second information in Table 4 occupies more signaling overheads.

In embodiments of this application, when the second access mode is the 4-step RACH, the first access mode is not limited to the foregoing access modes.

In this embodiment of this application, when the terminal sends the uplink data by using the contention-free CG or the contention-based CG, the uplink data may include UP data, or may not include UP data. This is not limited herein. When the terminal sends the uplink data by using the contention-free CG or the contention-based CG, if the uplink data includes the UP data, the terminal sends the second information and the uplink data by using the 4-step RACH, and sends the UP data to the network device when receiving acknowledgment information returned for the uplink data, so that the UP data can also be sent.

In this embodiment of this application, when the terminal fails to send the uplink data in the first access mode, the terminal falls back to the 4-step RACH, sends the uplink data by using the 4-step RACH, and also sends the second information. The second information indicates an access mode, namely, the first access mode, used by the terminal to send the uplink data before the terminal sends the uplink data in the second access mode. In this way, the network device learns that the motivation for the terminal to use the 4-step RACH is not the initial selection, but is the selection performed when the terminal falls back from the first access mode. This helps the network device optimize resource configuration information of the first access mode, and improve access efficiency or data transmission efficiency of the terminal.

Figure 3D:
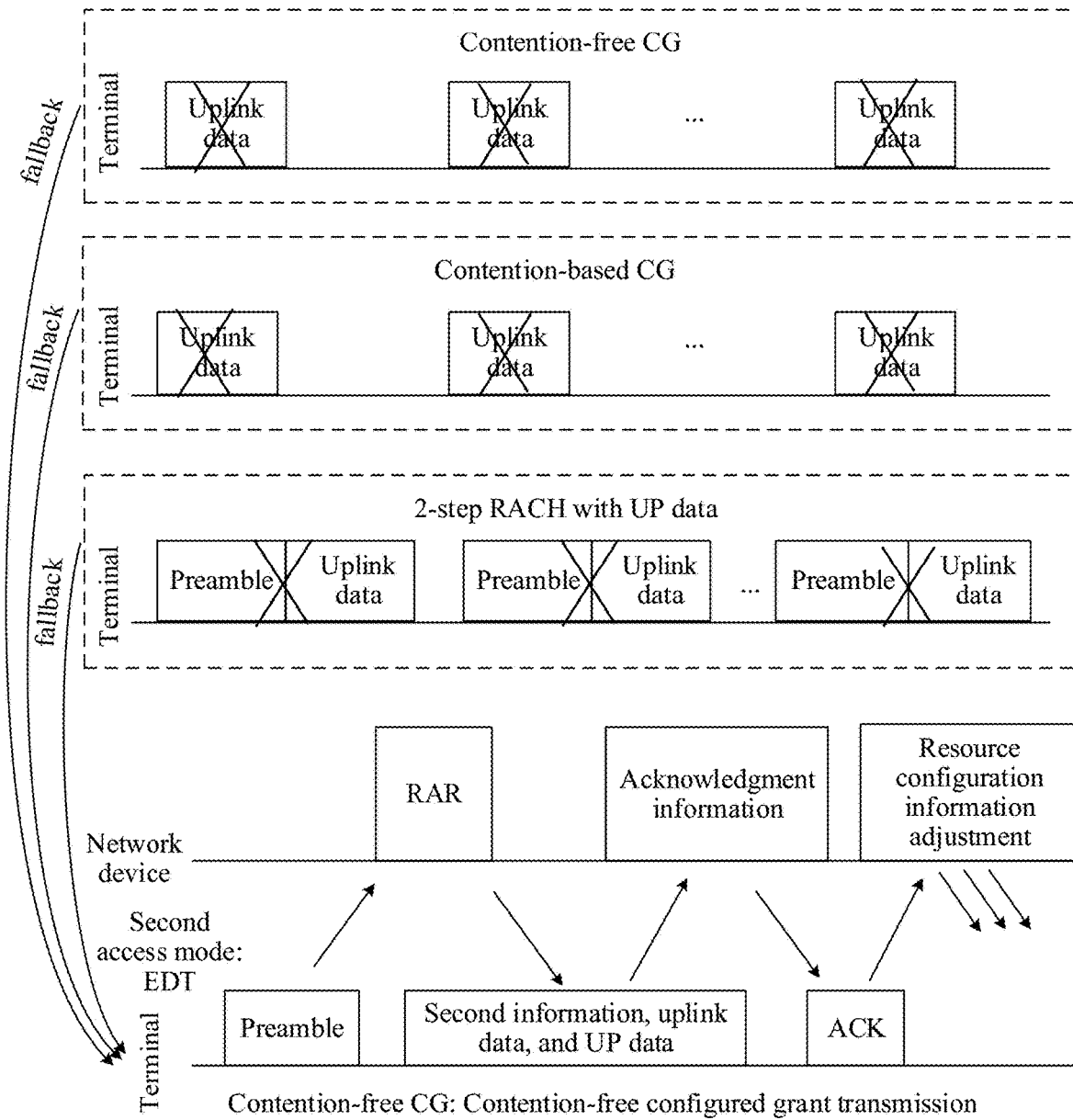
FIG. 3d is a schematic diagram of yet another information transmission method according to an embodiment of this application.

An information transmission method 400 is shown in FIG. 3d. When a terminal fails to send uplink data in one of three access modes: the contention-free CG, the contention-based CG, and the 2-step RACH with UP data, the terminal may fall back to the EDT. When sending a preamble by using an EDT process, and receiving random access response information returned for the preamble by a network device, the terminal sends second information and the uplink data to the network device based on a resource indicated by a UL grant in a response message.

Optionally, as shown in FIG. 3d, the information transmission method 400 further includes: The network device adjusts resource configuration information of the first access mode, and sends the adjusted resource configuration information to the terminal, so that the resource configuration information of the first access mode is optimized, and access efficiency or data transmission efficiency of the terminal is improved.

With reference to indexes in Table 5, the second information may indicate that the first access mode is one of the following: the contention-free CG, the contention-based CG, or the 2-step RACH with UP data.

TABLE 5

| Index | Description |
|---|---|
| 00 | Contention-free CG |
| 01 | Contention-based CG |
| 10 | 2-step RACH with UP data |
| 11 | Reserved |

For another example, if an index in the second information sent by the terminal by using the EDT is 00, the network device may learn that an access mode used by the terminal to send the uplink data before the terminal sends the uplink data by using the EDT is the contention-free CG. In this way, the network device can learn that, as shown in FIG. 3d, a motivation for the terminal to use the EDT is selection performed when the terminal falls back from the contention-free CG. This helps the network device optimize resource configuration information of the contention-free CG, and improve access efficiency or data transmission efficiency of the terminal.

For another example, if a first index in the second information sent by the terminal by using the EDT is 01, the network device may learn that an access mode used by the terminal to send the uplink data before the terminal sends the uplink data by using the EDT is the contention-based CG. In this way, the network device can learn that, as shown in FIG. 3d, a motivation for the terminal to use the EDT is selection performed when the terminal falls back from the contention-based CG. This helps the network device optimize resource configuration information of the contention-based CG, and improve access efficiency or data transmission efficiency of the terminal.

For another example, if the index in the second information sent by the terminal by using the EDT is 10, the network device may learn that an access mode used by the terminal to send the uplink data before the terminal sends the uplink data by using the EDT is the 2-step RACH with UP data. In this way, the network device can learn that, as shown in FIG. 3d, a motivation for the terminal to use the EDT is selection performed when the terminal falls back from the 2-step RACH with UP data. This helps the network device optimize resource configuration information of the 2-step RACH with UP data, and improve access efficiency or data transmission efficiency of the terminal.

In addition, descriptions corresponding to the index 11 in Table 5 may be "reserved". Optionally, the index 11 may be used to describe another subsequent access mode.

In another implementation, it is similar to the step S201 of the foregoing information transmission method 200 that, first information may be combined with second information and use an index similar to that shown in Table 5 to indicate whether a current access mode is an initial access mode, or indicate a specific access type of the first access mode. For example, as shown in Table 6, an index sent by the terminal is 00, the network device may learn that the current access mode used by the terminal is the initial access mode.

For a specific operation in which the terminal sends the second information based on Table 6 and the network device interprets the second information based on Table 6 to learn of the first access mode, refer to descriptions about Table 5. Details are not described herein again.

TABLE 6

| Index | Description |
| --- | --- |
| 00 | The current access mode is the initial access mode |
| 01 | Contention-free CG |
| 10 | Contention-based CG |
| 11 | 2-step RACH with UP data |

In an implementation, the first access mode in the information transmission method 400 is one of the following: the contention-based CG or the 2-step RACH with UP data. With reference to indexes in Table 7, the second information may indicate that the first access mode is one of the following: the contention-based CG or the 2-step RACH with UP data. In addition, the first information may be combined with the second information and use an index to indicate whether the current access mode is the initial access mode, or indicate a specific access type of the first access mode. In this way, as shown in Table 7, descriptions of an index 00 is that the current access mode used by the terminal is the initial access mode. To be specific, when the uplink data is sent in the first access mode, the sent first information may be 00.

In another implementation, the terminal may not send the first information when the uplink data is sent in the first access mode. In this case, when the index in Table 7 is 00, the index may be used to describe a specific type of the first access mode, for example, the contention-based CG. Correspondingly, descriptions corresponding to another index may be correspondingly adjusted.

In addition, descriptions corresponding to an index 11 in Table 7 may be "reserved". Optionally, the index 11 may be used to describe another subsequent access mode.

For a specific operation in which the terminal sends the second information based on Table 7 and the network device interprets the second information based on Table 7 to learn of the first access mode, refer to descriptions about Table 5. Details are not described herein again.

TABLE 7

| Index | Description |
| --- | --- |
| 00 | The current access mode is the initial access mode |
| 01 | The first access mode is the contention-based CG |
| 10 | The first access mode is the 2-step RACH with UP data |
| 11 | Reserved |

In this embodiment of this application, when the terminal sends the uplink data by using the contention-free CG or the contention-based CG, the uplink data includes UP data.

In embodiments of this application, when the second access mode is the EDT, the first access mode is not limited to the foregoing access modes.

In this embodiment of this application, if the terminal sends the uplink data in the first access mode, and the uplink data includes the UP data, when the terminal fails to send the uplink data in the first access mode, the terminal may fall back to the EDT. When sending the uplink data by using an EDT process, the terminal also sends the second information. The second information indicates that an access mode used by the terminal to send the uplink data before the terminal sends the uplink data in the second access mode is the first access mode. In this way, the network device learns that the motivation for the terminal to use the EDT is not initial selection, but is selection performed when the terminal falls back from the first access mode. This helps the network device optimize resource configuration information of the first access mode, and improve access efficiency or data transmission efficiency of the terminal.

Figure 3E:
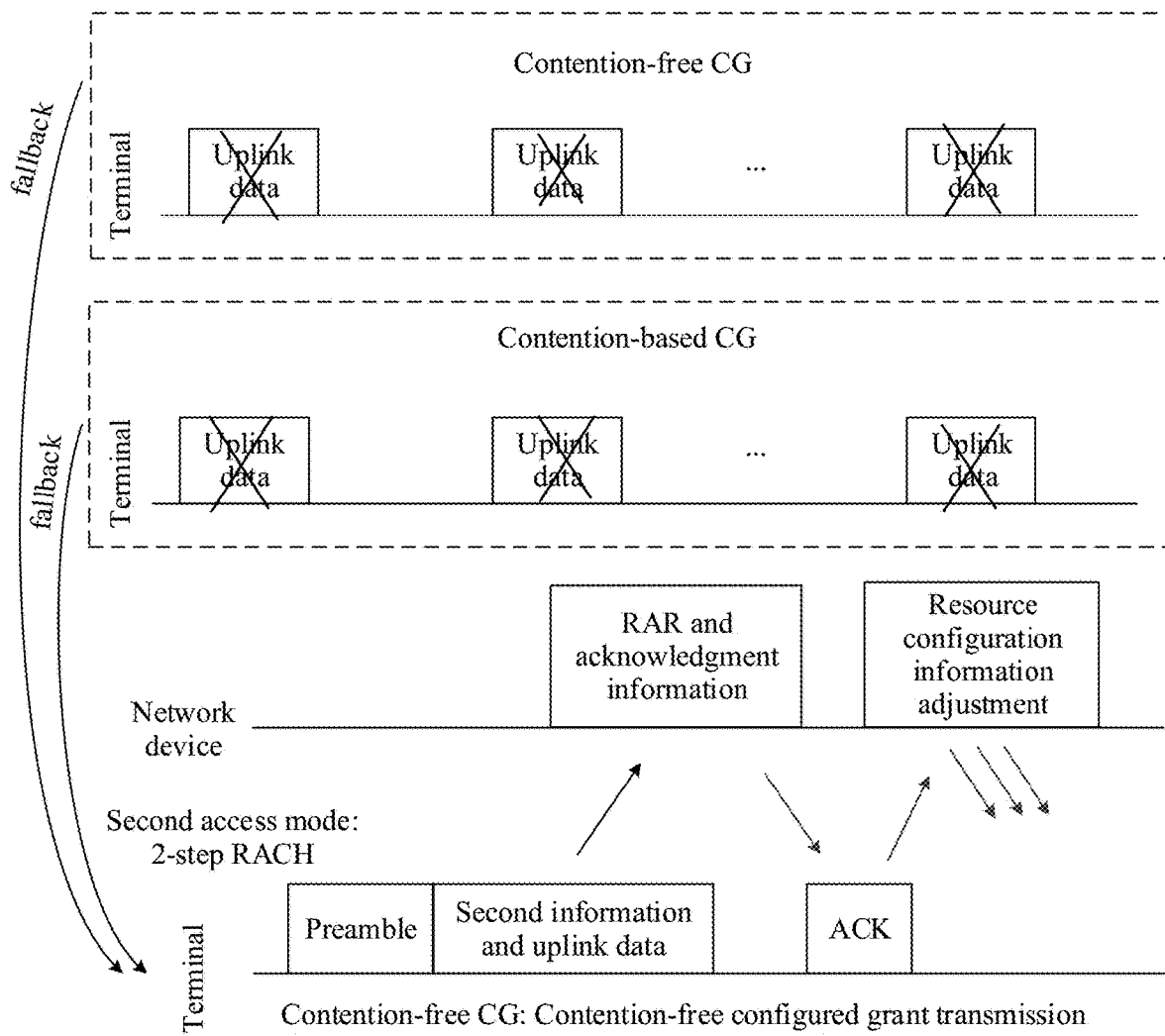
FIG. 3e is a schematic diagram of still yet another information transmission method according to an embodiment of this application.

An information transmission method 500 is shown in FIG. 3e. When a terminal fails to send uplink data in one of two access modes: contention-free CG or contention-based CG, the terminal may fall back to a 2-step RACH, and send a preamble, second information, and the uplink data to a network device by using a 2-step RACH process.

Optionally, as shown in FIG. 3e, the information transmission method 500 further includes: The network device adjusts resource configuration information of the first access mode, and sends the adjusted resource configuration information to the terminal, so that the resource configuration information of the first access mode is optimized, and access efficiency or data transmission efficiency of the terminal is improved.

With reference to indexes in Table 8, the second information may indicate that the first access mode is one of the following: contention-free CG or contention-based CG.

TABLE 8

| Index | Description |
| --- | --- |
| 00 | The first access mode is the contention-free CG |
| 01 | The first access mode is the contention-based CG |
| 10-11 | Reserved |

For example, if an index in the second information sent by the terminal by using the 2-step RACH is 00, the network device may learn that an access mode used by the terminal to send the uplink data before the terminal sends the uplink data by using the 2-step RACH is the contention-free CG. In this way, the network device can learn that, as shown in FIG. 3e, a motivation for the terminal to use the 2-step RACH is not initial selection, but is selection performed when the terminal falls back from the contention-free CG. This helps the network device optimize resource configuration information of the contention-free CG, and improve access efficiency or data transmission efficiency of the terminal.

For another example, if the index in the second information sent by the terminal by using the 2-step RACH is 10, the network device may learn that an access mode used by the terminal to send the uplink data before the terminal sends the uplink data by using the 2-step RACH is the contention-based CG. In this way, the network device can learn that, as shown in FIG. 3e, a motivation for the terminal to use the 2-step RACH is selection performed when the terminal falls back from the contention-based CG. This helps the network device optimize resource configuration information of the contention-based CG, and improve access efficiency or data transmission efficiency of the terminal.

In addition, descriptions corresponding to an index 10-11 in Table 8 may be "reserved". Optionally, the index 10-11 may be used to describe another subsequent access mode.

In another implementation, it is similar to the step S201 of the foregoing information transmission method 200 that, first information may be combined with second information and use an index similar to that shown in Table 8 to indicate whether a current access mode is an initial access mode, or indicate a specific access type of the first access mode. For example, as shown in Table 9, an index sent by the terminal is 00, the network device may learn that the current access mode used by the terminal is the initial access mode.

For a specific operation in which the terminal sends the second information based on Table 9 and the network device interprets the second information based on Table 9 to learn of the first access mode, refer to descriptions about Table 8. Details are not described herein again.

In addition, descriptions corresponding to an index 11 in Table 9 may be "reserved". Optionally, the index 11 may be used to describe another subsequent access mode.

TABLE 9

| Index | Description |
| --- | --- |
| 00 | The current access mode is the initial access mode |
| 01 | The first access mode is the contention-free CG |
| 10 | The first access mode is the contention-based CG |
| 11 | Reserved |

In an implementation, the first access mode in the information transmission method 500 is the contention-based CG. With reference to indexes in Table 10, the second information may indicate that the first access mode is the contention-based CG. In addition, the first information may be combined with the second information and use an index to indicate whether the current access mode is the initial access mode, or indicate a specific access type of the first access mode. In this way, as shown in Table 10, descriptions of an index 0 is that the current access mode used by the terminal is the initial access mode. To be specific, when the uplink data is sent in the first access mode, the sent first information may be 0.

In another implementation, the terminal may not send the first information when the uplink data is sent in the first access mode. In this case, when the index in Table 10 is 0, the index may be used to describe a specific type of the first access mode, for example, the contention-based CG. Correspondingly, descriptions corresponding to another index may be correspondingly adjusted.

For a specific operation in which the terminal sends the second information based on Table 10 and the network device interprets the second information based on Table 10 to learn of the first access mode, refer to descriptions about Table 8. Details are not described herein again.

TABLE 10

| Index | Description |
| --- | --- |
| 0 | The current access mode is the initial access mode |
| 1 | Contention-based CG |

In this embodiment of this application, the index in the second information shown in Table 10 occupies only one bit. In comparison with the indexes in Table 8 and Table 9, the index in the second information shown in Table 10 can save signaling overheads.

In this embodiment of this application, when the terminal sends the uplink data by using the contention-based CG or the contention-free CG, the uplink data may include UP data, or may not include UP data. This is not limited herein.

In embodiments of this application, when the second access mode is the 2-step RACH, the first access mode is not limited to the foregoing access modes.

In this embodiment of this application, when the terminal fails to send the uplink data in the first access mode, the terminal falls back to the 2-step RACH, and sends the uplink data and the second information by using the 2-step RACH. The second information indicates an access mode, namely, the first access mode, used by the terminal to send the uplink data before the terminal sends the uplink data by using the 2-step RACH. In this way, the network device learns that the motivation for the terminal to use the 2-step RACH is not initial selection, but is fallback from the first access mode. This helps the network device optimize resource configuration information of the first access mode, and improve access efficiency or data transmission efficiency of the terminal.

In embodiments of this application, the second access mode that can be used by the terminal is not limited to the foregoing access modes. For example, the second access mode may alternatively be 2-step RACH with UP data. When the second access mode is 2-step RACH with UP data, the first access mode may be either contention-free CG or contention-based CG.

In embodiments of this application, a form, a value, and corresponding descriptions of the second information is not limited.

In the information transmission method 300 to the information transmission method 500, the network device may adjust the resource configuration information of the first access mode, to optimize the resource configuration information of the first access mode.

For example, the first access mode is 2-step RACH. The network device learns, from the first access mode indicated by the second information, that a quantity of terminals that fail to send the uplink data by using 2-step RACH is greater than a second threshold, and the network device detects that the quantity of terminals that fail to send the uplink data by using 2-step RACH is less than a third threshold. It indicates that initial transmit power of a preamble on 2-step RACH is insufficient, which causes 2-step RACH detection fails. Consequently, the network device increases the initial transmit power of a preamble on 2-step RACH, to improve a success rate of detecting the preamble on 2-step RACH, so as to improve the access efficiency of the terminal. Alternatively, the network device learns, from the first access mode indicated by the second information, that the quantity of terminals that fail to send the uplink data by using 2-step RACH is greater than the second threshold, and the network device detects that the quantity of terminals that fail to send the uplink data by using 2-step RACH is greater than the third threshold. It indicates that resources allocated by the network device for 2-step RACH are insufficient, and are insufficient for the terminal to send the uplink data by using 2-step RACH. Consequently, the network device increases the resources for the 2-step RACH, or decreases a threshold for selecting the 2-step RACH, so that fewer terminals can send the uplink data by using the 2-step RACH process, so as to increase the access efficiency or the data transmission efficiency of the terminal.

For another implementation of the information transmission method 300 to the information transmission method 500, refer to related content in the information transmission method 100 and the information transmission method 200. Details are not described herein again.

In the foregoing embodiments provided in this application, the methods provided in embodiments of this application are described from perspectives of the network device, the terminal, and interaction between the network device and the terminal. To implement functions in the method provided in the foregoing embodiments of this application, the network device and the terminal may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 4:
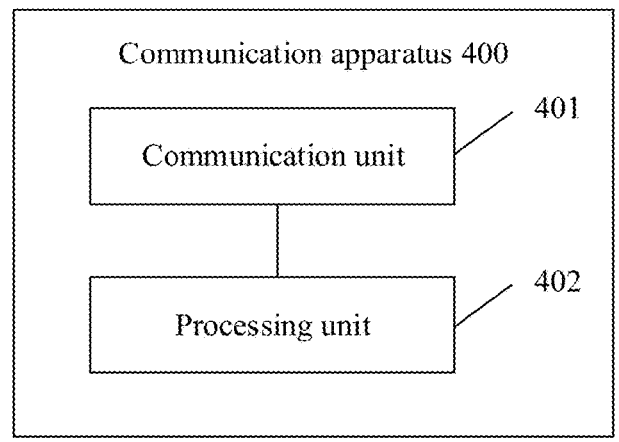
FIG. 4 is a schematic diagram of a structure of a communication apparatus according to an embodiment of this application.

FIG. 4 is a schematic diagram of a structure of a communication apparatus according to an embodiment of this application. The communication apparatus 400 shown in FIG. 4 may include a communication unit 401 and a processing unit 402. The communication unit 401 may include a sending unit and a receiving unit. The sending unit is configured to implement a sending function, the receiving unit is configured to implement a receiving function, and the communication unit 401 may implement a sending function and/or a receiving function. The transceiver unit may alternatively be described as a communication unit.

In an embodiment, the communication apparatus 400 may be a terminal, an apparatus in a terminal, or an apparatus that can be used together with a network device.

The communication unit 401 is configured to send second information and uplink data, where the uplink data is sent in a second access mode. The second information indicates a first access mode, and the first access mode is an access mode that is used by the terminal to send the uplink data before the terminal sends the uplink data in the second access mode.

It can be learned that when sending the uplink data in the second access mode, the communication apparatus 400 further sends the second information, to notify the network device of the first access mode that is used by the communication apparatus 400 to send the uplink data before the communication apparatus 400 sends the uplink data in the second access mode. This helps the network device learn that the second access mode is an access mode used by the communication apparatus 400 when the communication apparatus 400 fails to send the uplink data by using the first access mode, and helps the network device optimize resource configuration information of the first access mode, to improve access efficiency or data transmission efficiency of the terminal.

In an implementation, the second access mode is four-step random access (4-step RACH).

The first access mode is one of the following plurality of access modes: contention-free configured grant transmission (contention-free CG), contention-based configured grant transmission (contention-based CG), and two-step random access (2-step RACH).

In an implementation, the second access mode is early data transmission (EDT). The first access mode is one of the following plurality of access modes: contention-free configured grant transmission (contention-free CG), contention-based configured grant transmission (contention-based CG), and two-step random access with user plane data (2-step RACH with UP data).

In an implementation, the second access mode is two-step random access (2-step RACH). The first access mode is one of the following plurality of access modes: contention-free configured grant transmission (contention-free CG) and contention-based configured grant transmission (contention-based CG).

In an implementation, the communication unit 401 further sends third information, where the third information indicates quantities of times of sending the uplink data in the first access mode and in the second access mode by the terminal.

In an implementation, before sending the second information and the uplink data, the communication unit 401 sends the uplink data and first information in the first access mode, where the first information indicates that a current access mode is an initial access mode.

In another embodiment, the communication apparatus 400 may be a network device, an apparatus in a network device, or an apparatus that can be used together with a terminal.

In an implementation, the communication unit 401 is configured to receive second information and uplink data, where the uplink data is received in a second access mode. The processing unit 402 is configured to determine a first access mode based on the second information, and the first access mode is an access mode that is used by the terminal to send the uplink data before the terminal sends the uplink data in the second access mode.

In another implementation, before receiving the second information and the uplink data, the communication unit 401 receives the uplink data and first information, where the first information indicates that a current access mode of the terminal is an initial access mode.

For related content of this implementation, refer to related content of the foregoing method embodiments. Details are not described herein again.

This embodiment of this application and the method embodiments shown in the information transmission method 100 to the information transmission method 500 are based on a same concept, and technical effects brought by the embodiments are also the same. For specific principles, refer to the descriptions of embodiments shown in the information transmission method 100 to the information transmission method 500. Details are not described herein again.

Figure 5:
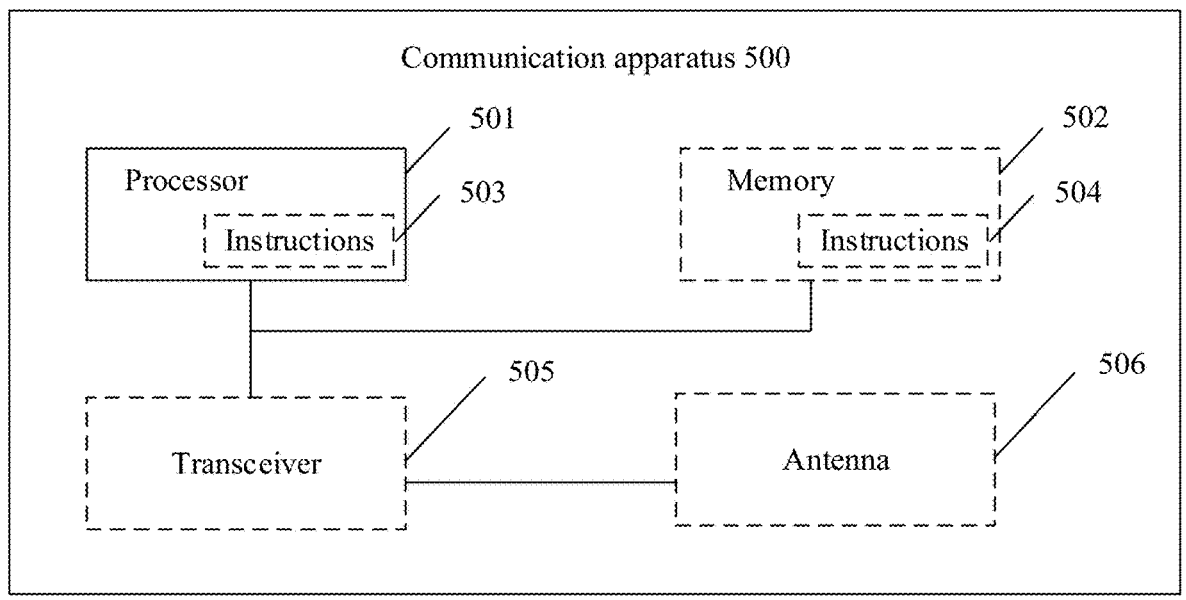
FIG. 5 is a schematic diagram of a structure of another communication apparatus according to an embodiment of this application.

FIG. 5 is a schematic diagram of a structure of a communication apparatus. The communication apparatus 500 may be a network device, or may be a terminal. Alternatively, the communication apparatus 500 may be a chip, a chip system, a processor, or the like that supports the network device in implementing the foregoing method, or may be a chip, a chip system, a processor, or the like that supports the terminal in implementing the foregoing method. The apparatus may be configured to implement the methods described in the foregoing method embodiments. For details, refer to the descriptions in the foregoing method embodiments.

The communication apparatus 500 may include one or more processors 501. The processor 501 may be a general-purpose processor, a dedicated processor, or the like. For example, the processor 501 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

Optionally, the communication apparatus 500 may include one or more memories 502. The one or more memories 502 may store instructions 504, and the instructions may be run on the processor 501, to enable the communication apparatus 500 to perform the method described in the foregoing method embodiments. Optionally, the memory 502 may further store data. The processor 501 and the memory 502 may be separately disposed, or may be integrated together.

Optionally, the communication apparatus 500 may further include a transceiver 505 and an antenna 506. The transceiver 505 may be referred to as a transceiver unit, a transceiver, a transceiver circuit, or the like, and is configured to implement a transceiver function. The transceiver 505 may include a receiver and a transmitter. The receiver may be referred to as a receiver, a receiver circuit, or the like, and is configured to implement a receiving function. The transmitter may be referred to as a transmitter, a transmitter circuit, or the like, and is configured to implement a sending function.

When the communication apparatus 500 is the terminal, the processor 501 is configured to perform S103 in the information transmission method 100. The transceiver 505 is configured to perform S101 in the information transmission method 100, and perform S201, S202, and S206 in the information transmission method 200.

When the communication apparatus 500 is the network device, the processor 501 is configured to perform S205 in the information transmission method 200. The transceiver 505 is configured to perform S102 in the information transmission method 100, and perform S203 and S204 in the information transmission method 200.

In another possible design, the processor 501 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, optionally, the processor 501 may store instructions 503, and the instructions 503 run on the processor 501, to enable the communication apparatus 500 to perform the method described in the foregoing method embodiments. The instructions 503 may be fixed in the processor 501. In this case, the processor 501 may be implemented by hardware.

In still another possible design, the communication apparatus 500 may include a circuit. The circuit may implement a sending, receiving, or communication function in the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The communication apparatus in the foregoing embodiments may be a network device or a terminal. However, a scope of the communication apparatus described in this application is not limited thereto, and a structure of the communication apparatus may not be limited by FIG. 5. The communication apparatus may be an independent device or may be a part of a large device. For example, the communication apparatus may be:

(1) an independent integrated circuit IC, a chip, or a chip system or subsystem;
(2) a set including one or more ICs, where optionally, the IC set may further include a storage component configured to store data and instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) another device, or the like.

Figure 6:
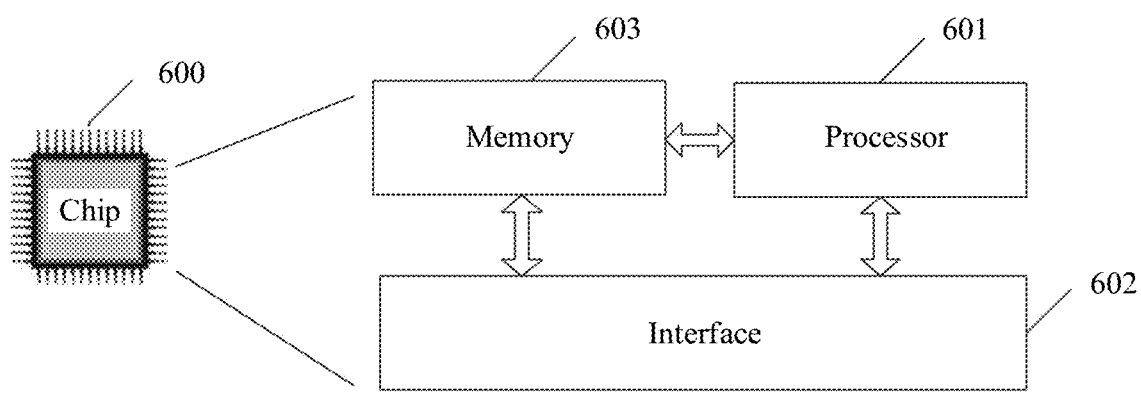
FIG. 6 is a schematic diagram of a structure of a chip according to an embodiment of this application.

For a case in which the communication apparatus may be a chip or a chip system, refer to a schematic diagram of a structure of the chip shown in FIG. 6. The chip 600 shown in FIG. 6 includes a processor 601 and an interface 602. There may be one or more processors 601, and there may be a plurality of interfaces 602.

For a case in which the chip is configured to implement a function of the terminal in embodiments of this application, the interface 602 is configured to send second information and uplink data, where the uplink data is sent in a second access mode. The second information indicates a first access mode, and the first access mode is an access mode that is used by the terminal to send the uplink data before the terminal sends the uplink data in the second access mode.

Optionally, the chip further includes a memory 603, and the memory 603 is configured to store program instructions and data that are necessary for the terminal.

For a case in which the chip is configured to implement a function of the network device in embodiments of this application, the interface 602 is configured to receive second information and uplink data, where the uplink data is received in a second access mode. The processor 601 is configured to determine a first access mode based on the second information, and the first access mode is an access mode that is used by the terminal to send the uplink data before the terminal sends the uplink data in the second access mode.

Optionally, the chip further includes a memory 603, and the memory 603 is configured to store program instructions and data that are necessary for the network device.

A person skilled in the art may further understand that various illustrative logical blocks (illustrative logic block) and steps (step) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

This embodiment of this application and the method embodiments shown in the information transmission method 100 to the information transmission method 500 are based on a same concept, and technical effects brought by the embodiments are also the same. For specific principles, refer to the descriptions of embodiments shown in the information transmission method 100 to the information transmission method 500. Details are not described herein again.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the communication apparatus provided in embodiments of this application may also implement these features or functions. Details are not described herein again.

A person skilled in the art may further understand that various illustrative logical blocks (illustrative logic block) and steps (step) that are listed in embodiments of this application may be implemented by using electronic hardware, computer software, or a combination thereof. Whether the functions are implemented by using hardware or software depends on particular applications and a design requirement of the entire system.

It should be understood that the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

This application further provides a computer-readable medium, configured to store computer software instructions. When the instructions are executed by a communication apparatus, the method in the foregoing method embodiments is implemented.

This application further provides a computer program product including instructions. When the instructions are executed by a communication apparatus, the method in the foregoing method embodiments is implemented.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, wherein the method comprises:
   sending, by a terminal, second information and uplink data, wherein the uplink data is sent in a second access mode; and
   the second information indicates a first access mode, and the first access mode is useable by the terminal to send the uplink data before the terminal sends the uplink data in the second access mode.

2. The method according to claim 1, wherein
   the second access mode is four-step random access channel (RACH); and
   the first access mode is one of the following plurality of access modes:
      contention-free configured grant transmission,
      contention-based configured grant transmission, or
      two-step RACH.

3. The method according to claim 1, wherein
   the second access mode is early data transmission; and
   the first access mode is one of the following plurality of access modes:
      contention-free configured grant transmission,
      contention-based configured grant transmission, or
      two-step random access channel with user plane data.

4. The method according to claim 1, wherein
   the second access mode is two-step random access channel; and
   the first access mode is one of the following plurality of access modes:
      contention-free configured grant transmission,
      contention-based configured grant transmission.

5. The method according to claim 1, wherein the method further comprises:
   sending, by a terminal, third information, wherein the third information is useable to indicate a number of times of sending the uplink data in the first access mode and in the second access mode.

6. The method according to claim 5, wherein the method further comprises:
   before the terminal sends the second information and the uplink data, sending, by the terminal, the uplink data and first information in the first access mode, wherein the first information is useable to indicate that a current access mode is an initial access mode.

7. An information transmission method, wherein the method comprises:
   receiving, by a network device, second information and uplink data, wherein the uplink data is received in a second access mode; and
   determining, by the network device, a first access mode based on the second information, wherein the first access mode is useable by the terminal to send the uplink data before the terminal sends the uplink data in the second access mode.

8. The method according to claim 7, wherein
   the second access mode is four-step random access channel (RACH); and
   the first access mode is one of the following plurality of access modes:
      contention-free configured grant transmission,
      contention-based configured grant transmission, or
      two-step RACH.

9. The method according to claim 7, wherein
   the second access mode is early data transmission; and
   the first access mode is one of the following plurality of access modes:
      contention-free configured grant transmission,
      contention-based configured grant transmission, or
      two-step random access channel with user plane data.

10. The method according to claim 7, wherein
    the second access mode is two-step random access channel; and
    the first access mode is one of the following plurality of access modes:
       contention-free configured grant transmission, or
       contention-based configured grant transmission.

11. The method according to claim 7, wherein the method further comprises:
    before the network device receives the second information and the uplink data, receiving, by the network device, the uplink data and first information, wherein the first information is useable to indicate that a current access mode is an initial access mode.

12. The method according to claim 7, wherein the method further comprises:
    receiving, by the network device, third information, wherein the third information is useable to indicate a number of times of sending the uplink data in the first access mode and in the second access mode by the terminal.

13. A communication apparatus, wherein the communication apparatus comprises:
    a transceiver, configured to send second information and uplink data, wherein the uplink data is sent in a second access mode,
    the second information indicates a first access mode, and the first access mode is useable by the terminal to send the uplink data before the terminal sends the uplink data in the second access mode.

14. The communication apparatus according to claim 13, wherein
    the second access mode is four-step random access channel (RACH); and
    the first access mode is one of the following plurality of access modes:
       contention-free configured grant transmission,
       contention-based configured grant transmission, or
       two-step RACH.

15. The communication apparatus according to claim 13, wherein
    the second access mode is early data transmission; and
    the first access mode is one of the following plurality of access modes:
       contention-free configured grant transmission,
       contention-based configured grant transmission, or
       two-step random access channel with user plane data.

16. The communication apparatus according to claim 13, wherein
    the second access mode is two-step random access channel; and the first access mode is one of the following plurality of access modes:
contention-free configured grant transmission, or
contention-based configured grant transmission.

17. The communication apparatus according to claim 13, wherein
the transceiver is further configured to send third information, wherein the third information is useable to indicate a number of times of sending the uplink data in the first access mode and in the second access mode.

18. The communication apparatus according to claim 17, wherein
the transceiver is further configured to send the uplink data and first information in the first access mode before the transceiver is configured to send the second information and the uplink data, wherein the first information is useable to indicate that a current access mode is an initial access mode.

\* \* \* \* \*